(12) United States Patent
Novikov

(10) Patent No.: US 11,731,731 B2
(45) Date of Patent: Aug. 22, 2023

(54) BICYCLE PROPULSION SYSTEM FOR ELECTRIC BICYCLE CONVERSION

(71) Applicant: Aram Novikov, San Jose, CA (US)

(72) Inventor: Aram Novikov, San Jose, CA (US)

(73) Assignee: Aram Novikov, San Jose, CA (US)

( * ) Notice: Subject to any disclaimer, the term of this patent is extended or adjusted under 35 U.S.C. 154(b) by 0 days.

(21) Appl. No.: 17/714,106

(22) Filed: Apr. 5, 2022

(65) Prior Publication Data

US 2022/0227456 A1   Jul. 21, 2022

Related U.S. Application Data

(63) Continuation of application No. 16/793,588, filed on Feb. 18, 2020, now Pat. No. 11,325,677.

(60) Provisional application No. 62/806,898, filed on Feb. 17, 2019, provisional application No. 62/806,817, filed on Feb. 17, 2019.

(51) Int. Cl.
| | |
|---|---|
| *B62M 6/60* | (2010.01) |
| *B62M 6/90* | (2010.01) |
| *B62M 6/40* | (2010.01) |
| *B62M 6/50* | (2010.01) |
| *B62M 6/65* | (2010.01) |

(52) U.S. Cl.
CPC ............ *B62M 6/60* (2013.01); *B62M 6/40* (2013.01); *B62M 6/50* (2013.01); *B62M 6/65* (2013.01); *B62M 6/90* (2013.01)

(58) Field of Classification Search
CPC . B62M 6/60; B62M 6/40; B62M 6/50; B62M 6/65; B62M 6/90; B62M 1/32; B62M 6/70
See application file for complete search history.

(56) References Cited

U.S. PATENT DOCUMENTS

| | | | | |
|---|---|---|---|---|
| 5,934,401 A | * | 8/1999 | Mayer | ..................... B62M 6/60 180/220 |
| 10,458,520 B2 | * | 10/2019 | Brunner | .................. F16H 3/005 |
| 2012/0313344 A1 | * | 12/2012 | Dal Pozzo | ............. B62K 19/30 280/288.4 |
| 2014/0196970 A1 | * | 7/2014 | Biechele | ................ B62K 19/34 180/206.4 |

(Continued)

*Primary Examiner* — Kevin Hurley
*Assistant Examiner* — Marlon A Arce
(74) *Attorney, Agent, or Firm* — Run8 Patent Group, LLC; Peter Miller

(57) ABSTRACT

A bicycle propulsion system including a concentric rotor assembly and a chassis assembly. The concentric rotor assembly: defines an outer drive surface; defines an inner retention surface; includes a set of sprocket brackets arranged about the inner retention surface of the concentric rotor assembly and configured to engage with teeth of a bicycle sprocket; and is configured to engage around the bicycle sprocket, wherein a center axis of the outer drive surface is concentric with a rotational axis of the bicycle sprocket. The chassis assembly: is configured to secure to a stay of the bicycle; includes a retention subassembly configured to translationally constrain the concentric rotor assembly relative to the chassis assembly; includes a drive subassembly configured to engage the outer drive surface of the concentric rotor assembly; and includes a motor configured to rotate the concentric rotor assembly via the drive subassembly.

20 Claims, 8 Drawing Sheets

(56) References Cited

U.S. PATENT DOCUMENTS

| | | | | |
|---|---|---|---|---|
| 2014/0300078 | A1* | 10/2014 | Ruffieux | B62L 5/006 |
| | | | | 474/1 |
| 2018/0229800 | A1* | 8/2018 | Lee | G01L 5/108 |
| 2019/0256169 | A1* | 8/2019 | Hamed | B62M 9/122 |
| 2019/0263472 | A1* | 8/2019 | Kimpara | B62M 6/55 |

* cited by examiner

BICYCLE PROPULSION SYSTEM FOR ELECTRIC BICYCLE CONVERSION

CROSS-REFERENCE TO RELATED APPLICATIONS

This Application is a continuation application of U.S. patent application Ser. No. 16/793,588, filed on 18 Feb. 2020, which claims the benefit of U.S. Provisional Application No. 62/806,817, filed on 17 Feb. 2019, and U.S. Provisional Application No. 62/806,898, filed on 17 Feb. 2019, each of which is incorporated in its entirety by this reference.

TECHNICAL FIELD

This invention relates generally to the field of electric bicycle propulsion and more specifically to a new and useful electric bicycle conversion system in the field of electric bicycle propulsion

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Bicycle Propulsion System

Figure 3:
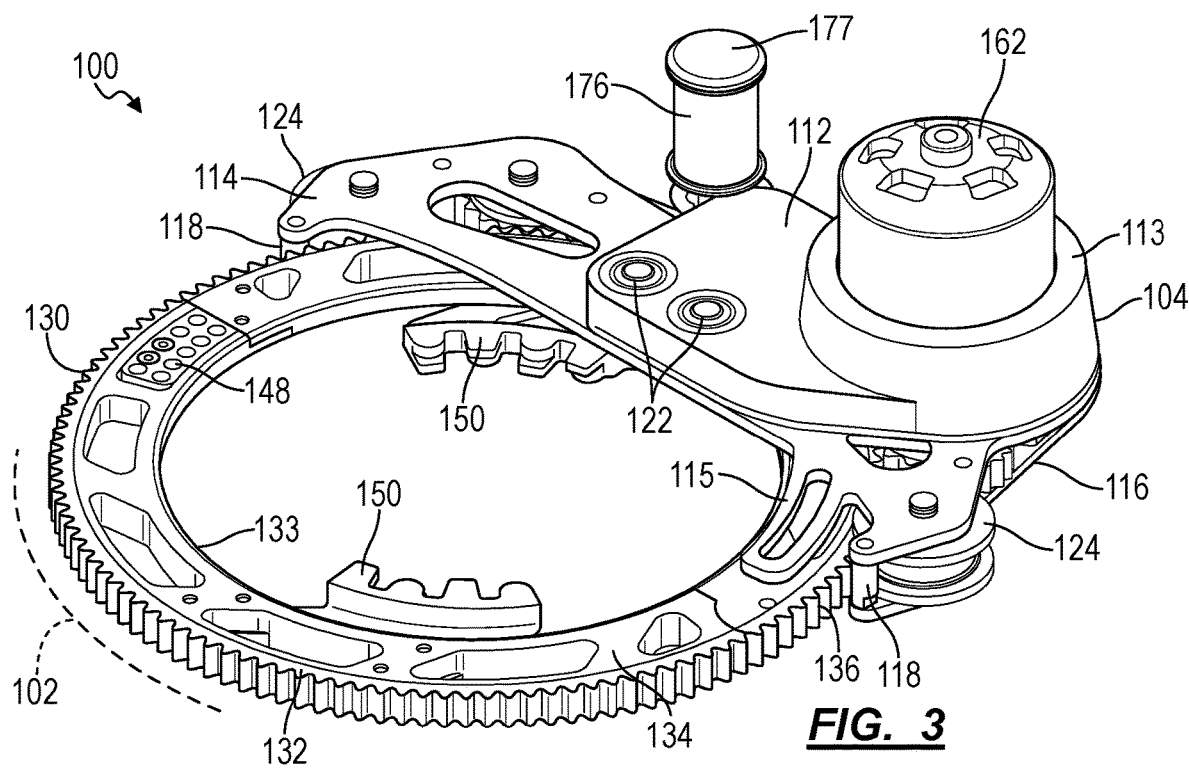
FIG. 3 is a schematic representation of the system.
Figure 6:
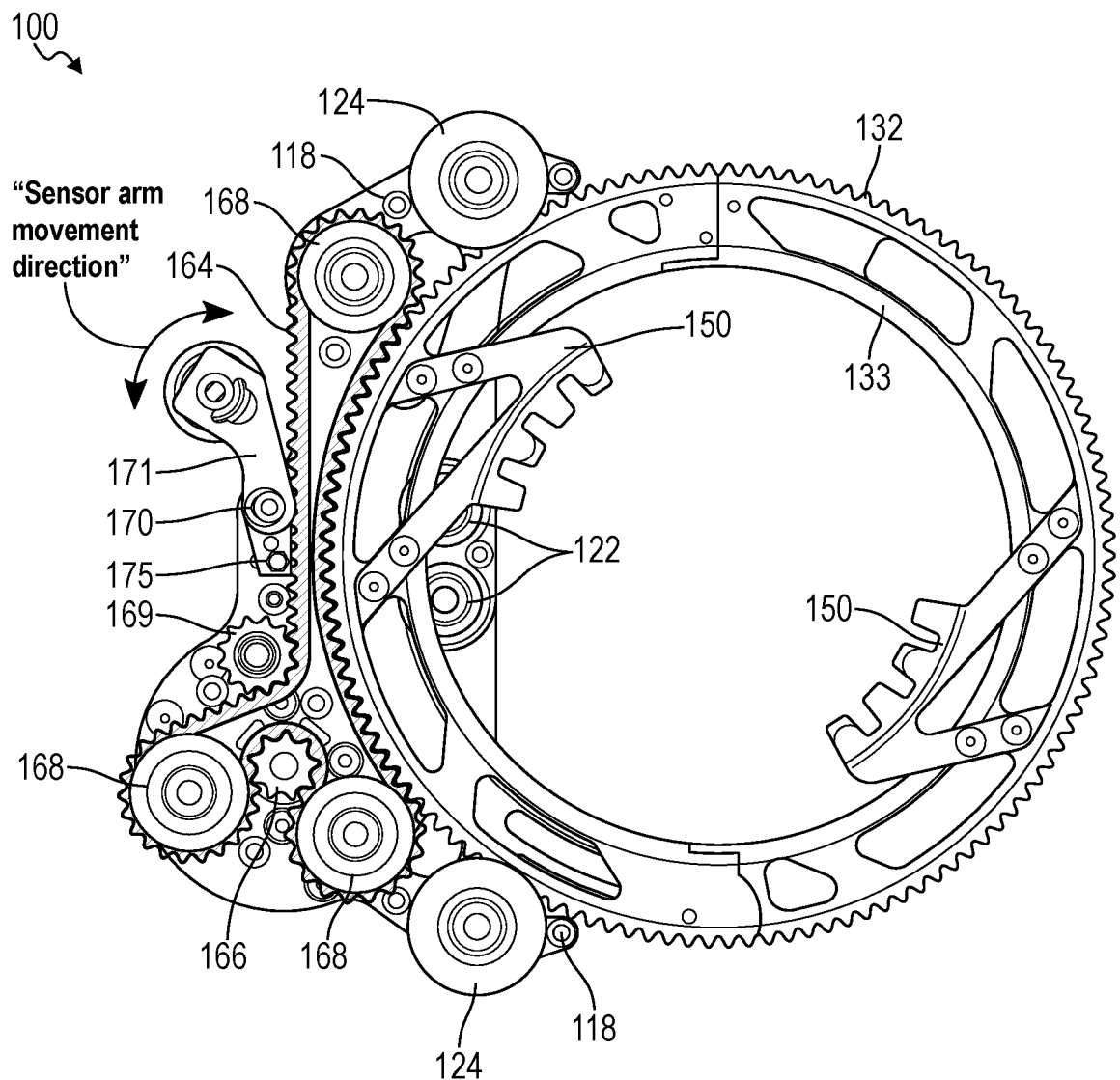
FIG. 6 is a schematic representation of the system.

As shown in FIGS. 3 and 6, a bicycle propulsion system 100 includes: a concentric rotor assembly 102; and a chassis assembly 104. The concentric rotor assembly 102: comprises a first rotor element 134 attached to a first sprocket bracket 151 configured to engage with a first bicycle sprocket; comprises a second rotor element 136 attached to a second sprocket bracket 152 configured to engage the first bicycle sprocket; and is configured to define a circular outer drive surface 132, to define a circular inner retention surface 133, and to transiently engage around the first bicycle sprocket in an engaged configuration of the concentric rotor assembly 102 via the first sprocket bracket 151 and the second sprocket bracket 152. The chassis assembly 104: is configured to transiently secure to a bicycle frame element; includes a retention subassembly configured to translationally constrain the concentric rotor assembly 102 relative to the chassis assembly 104 while the concentric rotor assembly 102 is engaged around the first bicycle sprocket and the chassis assembly 104 is secured to the bicycle frame element; includes a drive subassembly configured to engage the concentric rotor assembly 102 via the circular outer drive surface 132; and comprises a motor 162 configured to rotate the concentric rotor assembly 102 about a center axis of the circular outer drive surface 132 via the drive subassembly, the motor 162 causing rotation of the first bicycle sprocket while the concentric rotor assembly 102 is engaged around the first bicycle sprocket.

Figure 7:
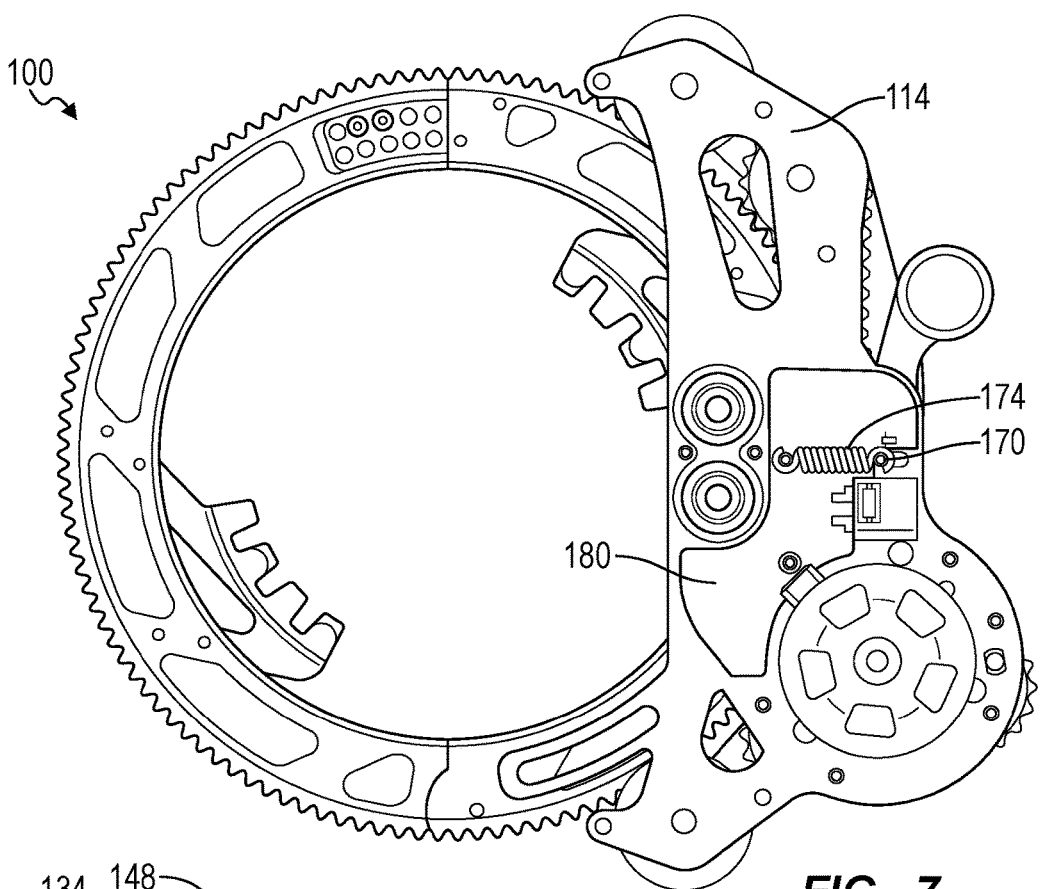
FIG. 7 is a schematic representation of the system.

One variation of the bicycle propulsion system 100, shown in FIGS. 3, 6, and 7, includes: a concentric rotor assembly 102 and a chassis assembly 104. In this variation, the concentric rotor assembly 102 is configured to rigidly and transiently engage around a sprocket of a bicycle and includes a set of sprocket brackets 150 arranged about the concentric rotor assembly 102, the set of sprocket brackets 150 configured to engage with teeth of the sprocket of the bicycle. In this variation, the chassis assembly 104: is configured to transiently secure to a frame element of the bicycle; comprises a retention subassembly configured to translationally constrain the concentric rotor assembly 102 relative to the chassis assembly 104; includes a drive subassembly configured to engage the concentric rotor assembly 102; includes a motor 162 configured to rotate the concentric rotor assembly 102 about a center axis of the concentric rotor assembly 102 via the drive subassembly; includes a sensor arm 171 configured to engage with a chain of the bicycle via a chain roller 176 biased against the chain of the bicycle; and includes an electronics subsystem 180. In this variation, this electronics subsystem 180 is configured to: detect deflection of the sensor arm 171 caused by tension in the chain of the bicycle; and activate the motor 162 to rotate the concentric rotor 130 based on the deflection of the sensor arm 171.

One variation of the bicycle propulsion system 100, shown in FIG. 3, includes a concentric rotor assembly 102 and a chassis assembly 104. In this variation, the concentric rotor assembly 102: defines a circular outer drive surface 132; defines an inner retention surface 133; comprises a set of sprocket brackets 150 arranged about the inner retention surface 133 of the concentric rotor assembly 102 and configured to engage with teeth of a bicycle sprocket; and is configured to transiently engage around the bicycle sprocket, wherein a center axis of the circular outer drive surface 132 is concentric with a rotational axis of the bicycle sprocket. In this variation, the chassis assembly 104: is configured to transiently secure to a stay of the bicycle; includes a retention subassembly configured to translationally constrain the concentric rotor assembly 102 relative to the chassis assembly 104; and includes a drive subassembly configured to engage the circular outer drive surface 132 of the concentric rotor assembly 102; and includes a motor 162 configured to rotate the concentric rotor assembly 102 about a center axis of the circular outer drive surface 132 via the drive subassembly.

2. Applications

Figure 1:
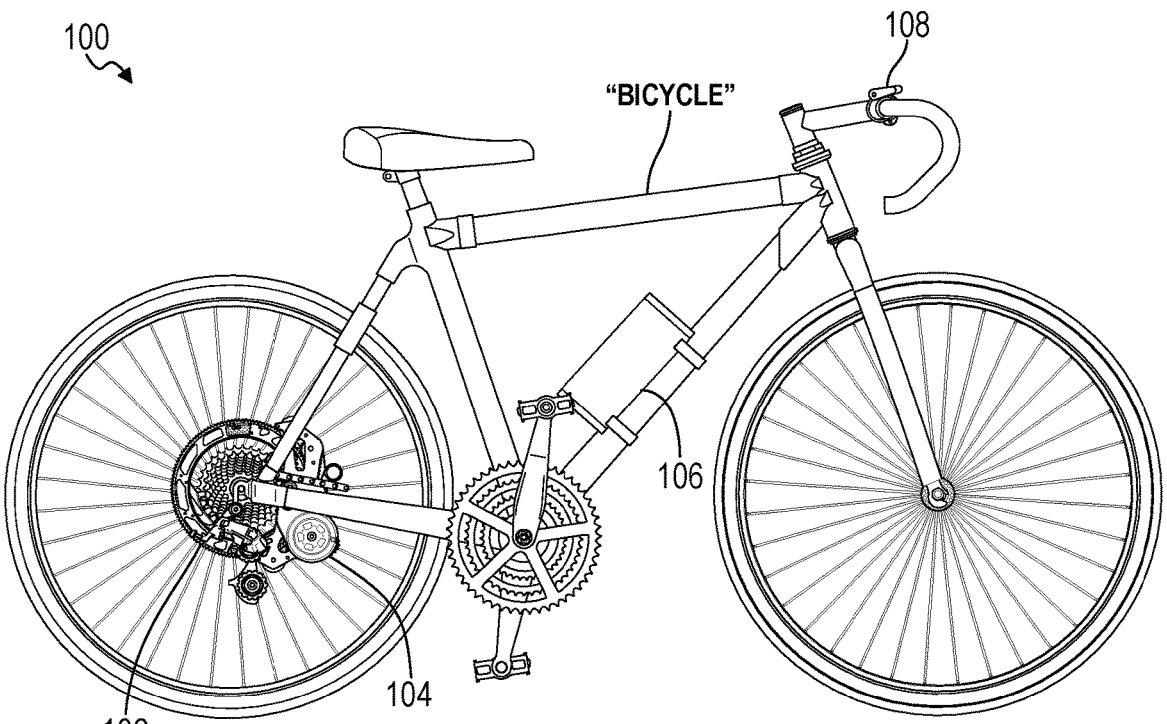
FIG. 1 is a schematic representation of a system.

Generally, as shown in FIG. 1, a bicycle propulsion system 100 includes: a rotor configured to transiently mount to a sprocket of a bicycle (e.g., a rear sprocket of the bicycle, front chainring of the bicycle); a chassis assembly configured to transiently mount to a frame element of the bicycle (e.g., a chain stay of the bicycle, a seat stay of the bicycle); and a motor arranged in the chassis assembly and configured to drive the rotor, thereby generating additional torque about the sprocket of the bicycle and assisting a rider operating the bicycle.

More specifically, as shown in FIGS. 3, 4, 5, 6 and 7, the bicycle propulsion system 100 includes: a concentric rotor assembly 102 including a set of sprocket brackets 150 configured to transiently engage the sprocket of a bicycle in an engaged configuration and configured to release from the sprocket in a disengaged configuration; and a chassis assembly 104 that secures to the concentric rotor assembly 102 in the engaged configuration, transiently mates to a chain stay or seat stay of the bicycle, and includes a motor 162 and drive subassembly that transmits torque to the concentric rotor assembly 102. The concentric rotor assembly 102 is configured to open (or "split") to enable installation over and removal from a sprocket of a rear cogset of the bicycle without necessitating removal of the rear wheel from rear dropouts of the bicycle frame. The concentric rotor assembly 102 is also configured to close and latch around the sprocket in an engaged configuration in which the outer surface of the concentric rotor assembly 102 forms a continuous, circular outer drive surface 132; and in which sprocket brackets 150, extending toward the radial center of the concentric rotor assembly 102, engage teeth of the sprocket in order to transmit torque between the outer drive surface 132 and the sprocket. The chassis assembly 104: includes a set of rollers configured to engage and retain the concentric rotor assembly 102 in a "hub-less wheel" configuration when the concentric rotor assembly 102 is installed on a sprocket; includes an electronic motor; and includes a toothed drive belt 164 that runs between these rollers and the outer drive surface 132 of the concentric rotor assembly 102 and transmits torque from the electric motor into the concentric rotor assembly 102, which then transmits torque into the sprocket via the sprocket brackets 150. Furthermore, the chassis assembly 104 includes a boss or rest configured to engage a seat stay or chain stay near rear drops of the bicycle frame and thus prevent rotation of the chassis assembly 104 about a pitch axis of the bicycle when the motor is actuated; and a strap or other coupler configured to wrap around the seat stay or chain stay of the bicycle and thus constrain rotation of the chassis assembly 104 about a yaw axis of the bicycle while the concentric rotor assembly 102 and the rollers cooperate to constrain translation of the chassis assembly 104 and rotation of the chassis assembly 104 about a roll axis of the bicycle.

Thus, the chassis assembly 104 can be installed on a bicycle frame by wrapping the strap around a right seat stay or right chain stay of the bicycle near a rear dropout of the bicycle without additional tools. The concentric rotor assembly 102 can then be opened, a first sprocket bracket 151 that is coupled to a first rotor element 134 at a proximal end of the first sprocket bracket can be located on the innermost sprocket or the rear cogset of the bicycle. The first rotor element 134 can then be fed into the chassis assembly 104 and along the retaining rollers. The second sprocket bracket 152, attached to a second rotor element 136, can be closed against an opposite side of the sprocket and latched to the first rotor element 134 and, by extension, the first sprocket bracket 151 coupled thereto. The concentric rotor assembly 102 and the chassis assembly 104 can thus cooperate: to fully constrain the chassis assembly 104 on the bicycle frame; and to enable the concentric rotor assembly 102 to rotate with the rear wheel of the bicycle by passing along the rollers through the chassis assembly 104. A chain roller 176—coupled to a sensor subassembly 170—can then be folded to engage and ride along the bicycle's chain, a battery assembly 106 can be set in a bolder holder mounted on the bicycle frame, and a power cable can be routed from the battery assembly 106 to the chassis assembly 104 to complete assembly of the bicycle propulsion system 100 on the bicycle, such as in under one minute. Later, these elements of the bicycle propulsion system 100 can be similarly removed from the bicycle over a similar duration of time in order to return the bicycle to an unassisted configuration.

Therefore, the bicycle propulsion system 100 includes a chassis assembly 104 and a concentric rotor assembly 102 that cooperate: to enable rapid installation onto a bicycle when a user desires pedal assistance (e.g., in preparation for a commute); and to enable rapid removal from this bicycle, such as when the user parks the bicycle in a public space or when the user no longer desires pedal assistance (e.g., in preparation for a bike ride with friends or when cycling in a park), all without additional tools and without necessitating removal of a wheel or other native component from the bicycle.

Figure 12A:
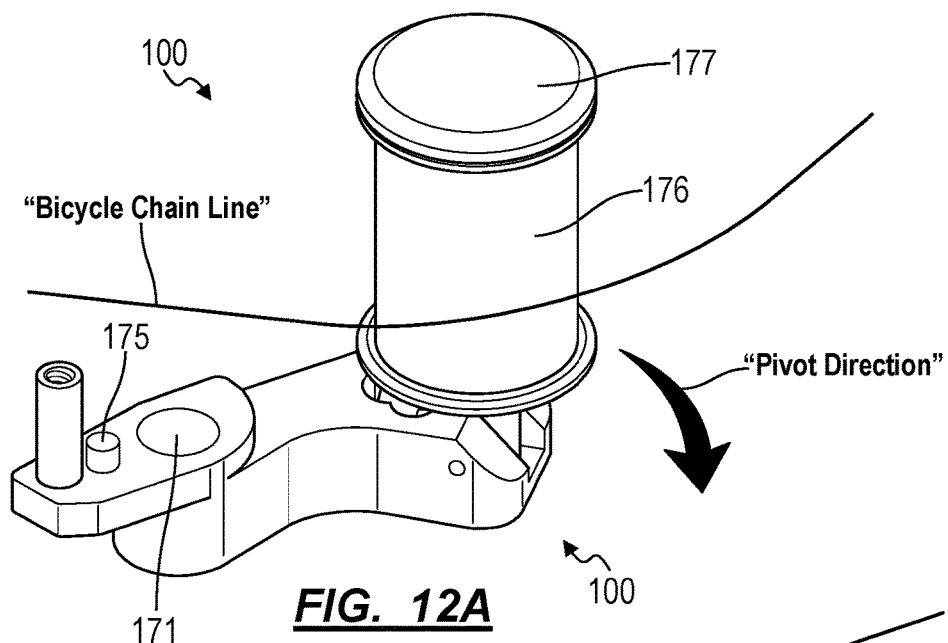
FIG. 12A is a schematic representation of the system.
Figure 12B:
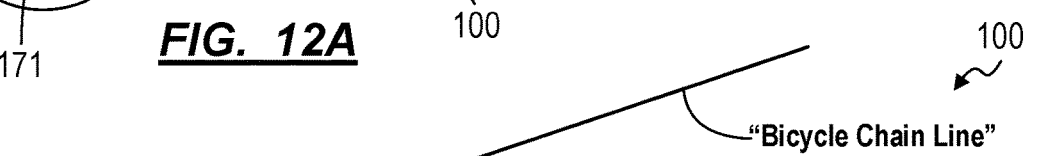
FIG. 12B is a schematic representation of the system.

Furthermore, as shown in FIGS. 12A and 12B the bicycle propulsion system 100 can: monitor tension in the chain of the bicycle—which is related to application of torque to pedals of the bicycle by a user—via the chain roller 176 that rides on the chain and the sensor subassembly 170 coupled to the chain roller 176; interpret a target output torque or output power of the motor directly from this chain tension; and modulate the torque or power output of the motor accordingly. Because the sensor subassembly 170 and the chain roller 176 are integrated into the chassis assembly 104, the bicycle propulsion system 100 can monitor this control signal (i.e., chain tension) and implement closed-loop controls to modulate output torque or output power of the motor without necessitating installation of an additional sensor or module on the bicycle.

Thus, the bicycle propulsion system 100 can be quickly installed on bicycles—of a wide range of geometries and sizes—by locating three subsystems (i.e., the concentric rotor assembly 102, the chassis assembly 104, and the battery assembly 106) on the bicycle without any additional tools. When in use, the bicycle propulsion system 100 can supply additional power to the rear cogset (e.g., a bicycle cassette, a freehub) of the bicycle in order to assist a cyclist in propelling the bicycle forward as a function of power output by the cyclist. Similarly, the bicycle propulsion system 100 can be quickly removed from the bicycle, again without additional tools. Therefore, the bicycle propulsion system 100 can enable convenient and temporary conversion of a purely-manual bicycle to an electric bicycle with pedal assistance and vice versa, thereby enabling a cyclist to rapidly and seamlessly transition a single bicycle between a purely-manual configuration (e.g., for sport) and an electric bicycle configuration (e.g., for commuting).

2.1 System Overview

In one example, the bicycle propulsion system 100 transfers power to the cogset of a bicycle via a concentric rotor assembly 102 installed around a sprocket of the bicycle (i.e. a bicycle sprocket in a cassette, freehub, or chainring). The bicycle propulsion system 100 can include a concentric rotor assembly 102 configured to engage with a rear sprocket of a bicycle or, more specifically, an innermost sprocket in the cogset of the bicycle. Thus, the bicycle propulsion system 100 occupies one sprocket in a derailleur-based transmission of a bicycle while in the engaged configuration. In an alternative implementation, the bicycle propulsion system 100 includes a concentric rotor assembly 102 configured to engage with a front chainring of a bicycle.

Figure 10:
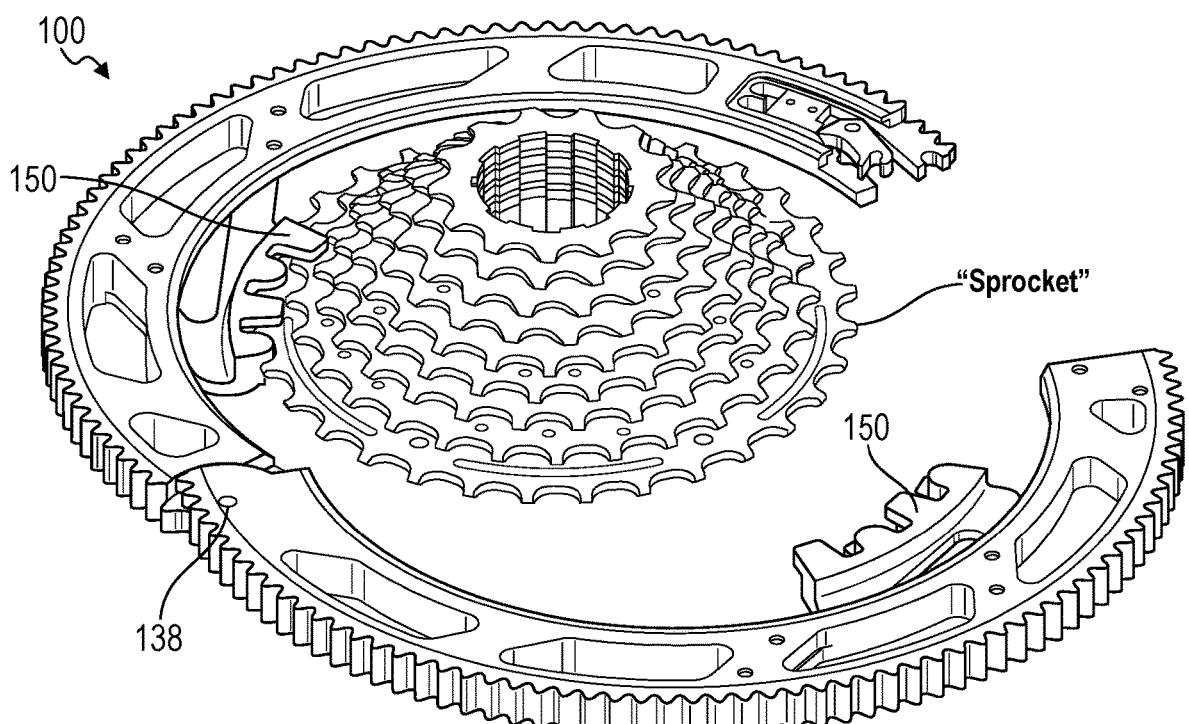
FIG. 10 is a schematic representation of the system.
Figure 11:
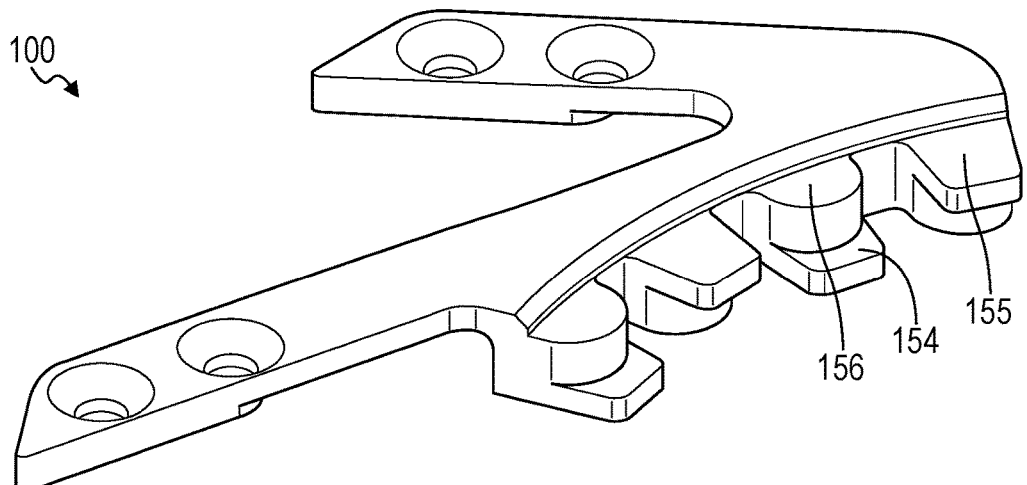
FIG. 11 is a schematic representation of the system.

Therefore, in the engaged configuration, the concentric rotor assembly 102 is configured to circumscribe a sprocket and inwardly extends a set of sprocket brackets 150 (e.g., two or more) configured to engage the teeth of the sprocket, as shown in FIG. 11. The concentric rotor assembly 102, in the engaged configuration shown in FIG. 8, also defines a circular outer drive surface 132 (with which the drive subassembly can engage) and a circular inner retention surface 133 (with which the retention subassembly can engage), thereby enabling components within the chassis assembly 104 to rotate the concentric rotor assembly 102 about a central axis aligned with the rotational axis of the sprocket, where the concentric rotor assembly 102 acts as a wheel in a hub-less wheel system. Additionally, the concentric rotor assembly 102 can include two hinged (shown in FIG. 9) or fully separable members which, when engaged with each other, cause the set of sprocket brackets 150 to align with the sprocket, thereby rotationally constraining the sprocket relative to the concentric rotor assembly 102, as shown in FIG. 10.

As shown in FIGS. 3, 4, 5, 6, and 7, the bicycle propulsion system 100 includes a chassis subsystem that secures the bicycle propulsion system 100 to a frame element of a bicycle and prevents rotation of the non-rotating components of the bicycle propulsion system 100 (such as the motor, electronics subsystem 180, drive subassembly, and retention subassembly) about the sprocket's rotational axis upon application of torque to the concentric rotor assembly 102. Therefore, the bicycle propulsion system can efficiently power transfer to the sprocket while preventing damage to the bicycle or the bicycle propulsion system 100 due to unintended movement of the bicycle propulsion system 100 relative to the frame of the bicycle. In addition to constraining the non-rotating components of the bicycles relative to the frame of the bicycle, the chassis assembly 104 houses the motor 162, the electronics subsystem 180 that controls the motor 162, the drive subassembly that transmits power from the motor 162 to the concentric rotor assembly 102, and the retention subassembly that prevents translational movement of the concentric rotor assembly 102 relative to the chassis assembly 104 while enabling rotation of the concentric rotor assembly 102 as a hub-less wheel.

In one implementation, the bicycle propulsion system 100 is configured to secure to a rear chain stay of a bicycle. In this implementation, the chassis assembly 104: includes an attachment element that secures the chassis assembly 104 to the right chain stay of the bicycle; and defines a form factor that houses the abovementioned subassemblies and components between the right chain stay, the rear wheel, and the rear derailleur of the bicycle.

Figure 2:
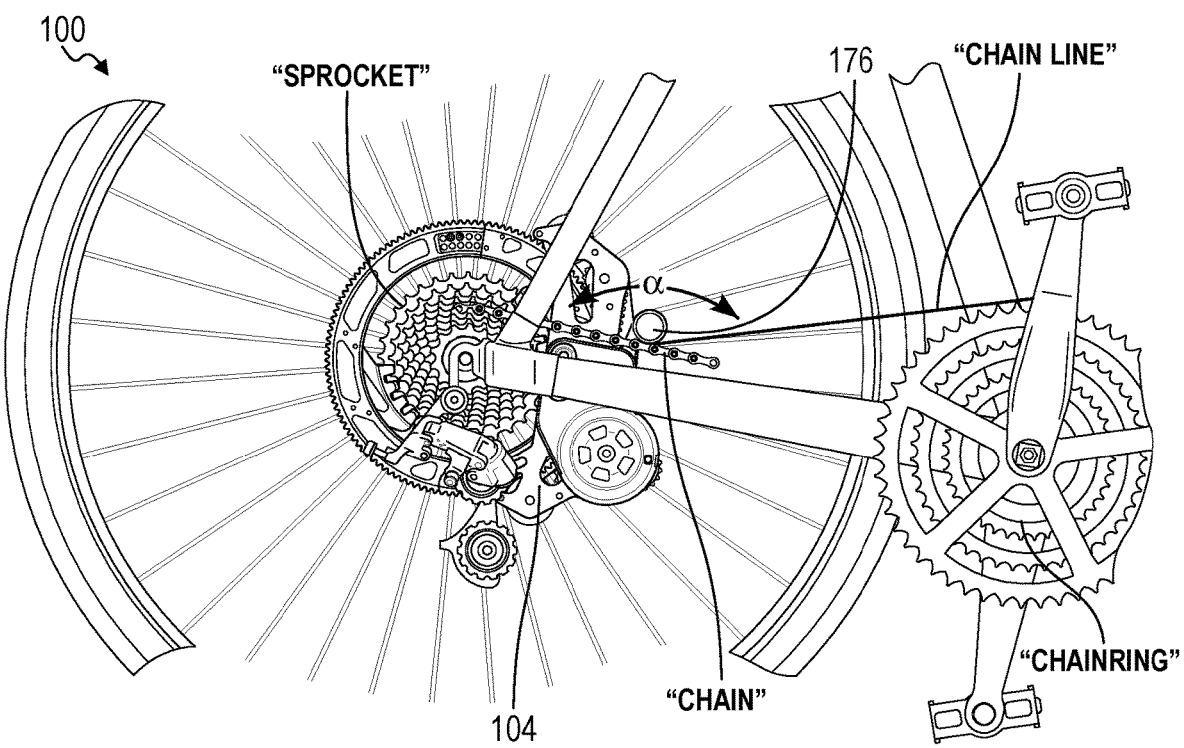
FIG. 2 is a schematic representation of the system.

In another implementation, the bicycle propulsion system 100 includes a chassis assembly 104 that further includes a sensor arm 171 extending from the chassis assembly 104 to engage with a chain of the bicycle, as shown in FIG. 2. The sensor arm 171 can include a chain roller 176 that is pressed or biased against the chain (e.g., via a spring acting on the sensor arm 171). Therefore, as a cyclist applies torque to the pedals of the bicycle, the chain tension increases, presses on the chain roller 176, and causes the sensor arm 171 to deflect relative to its initial position. Thus, the bicycle propulsion system 100 can estimate the power applied by a cyclist to the pedals of the bicycle during operation and can scale the power output of the motor 162 based on this estimation.

In one implementation, the bicycle propulsion system 100 can include a separate battery assembly 106 connected to the chassis assembly 104 via a power cable 182 and/or a throttle assembly 108 for modifying the level of assistance output by the bicycle propulsion system 100. Additionally, the bicycle propulsion system 100 can interface with an application installed on a mobile computation device (e.g., a smartphone, tablet, bike computer) to enable the cyclist to modify settings of the bicycle propulsion device.

2.2 Examples

In one example application of the bicycle propulsion system 100, a cyclist may install the bicycle propulsion system 100 in order to convert her standard road bicycle into an electric bicycle to facilitate commuting or to traverse more difficult terrain. The cyclist can then easily remove the bicycle propulsion system 100: to use the bicycle for exercise; to comply with legal restriction on electric bicycles in a particular area; to prevent theft of the bicycle propulsion system 100 while parking her bicycle; or for any other reason. Likewise, the cyclist can easily reinstall the bicycle propulsion system 100 whenever she desires pedal assistance.

In another example application, a bikeshare operator can install an instance of the bicycle propulsion system 100 on each bicycle in a fleet of bicycles in order to electrically assist users of this fleet of bicycles and improving the utility of these bicycles to commuters in an operational region. Upon mechanical failure of any bicycle propulsion system 100, the bikeshare operator can remove the bicycle propulsion system 100 from the affected bicycle and replace the bicycle propulsion unit with a functional bicycle propulsion system 100 while the original bicycle propulsion system 100 installed on the affected undergoes repairs. Therefore, by utilizing the bicycle propulsion system 100, as opposed to a pedal assistance system integrated with the bicycle, the bikeshare operator can minimize downtime in the fleet of electric pedal assist bicycles.

3. Concentric Rotor Assembly

Figure 8:
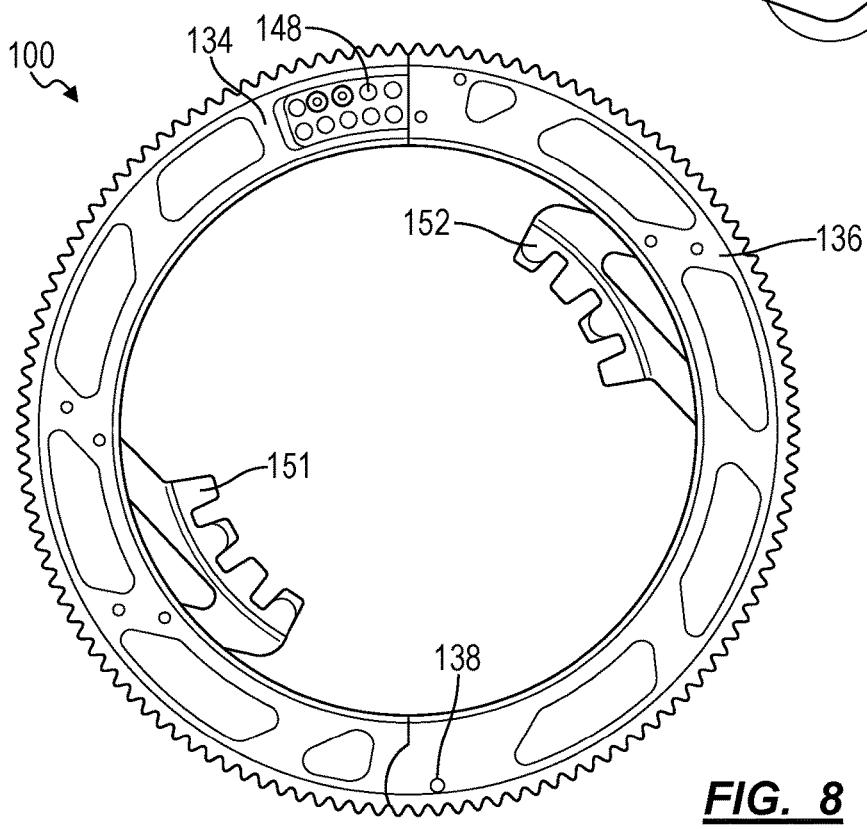
FIG. 8 is a schematic representation of the system.
Figure 9:
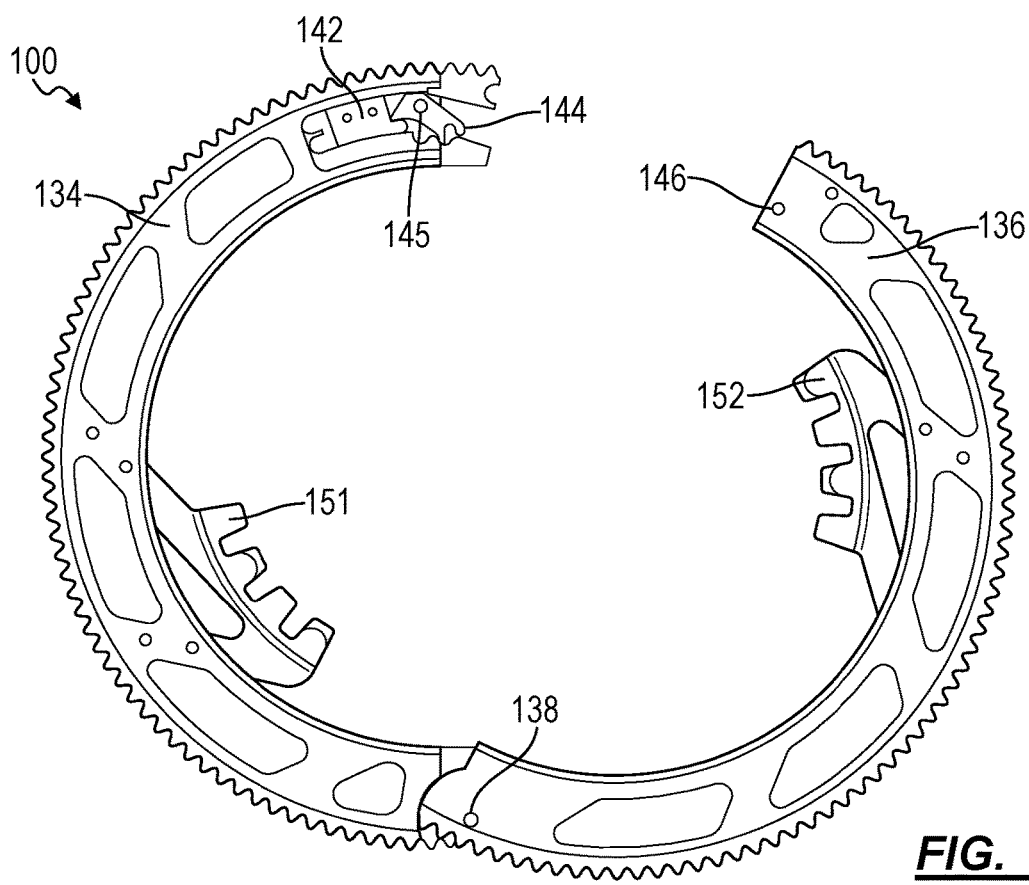
FIG. 9 is a schematic representation of the system.

Generally, the bicycle propulsion system 100 includes a concentric rotor assembly 102 that is clamped around or that otherwise engages a sprocket of a bicycle cogset, as shown in FIGS. 1, 8, 9, and 10. More specifically, the bicycle propulsion system 100 includes a concentric rotor assembly 102 configured to transiently engage around a sprocket of a bicycle and including a set of sprocket brackets 150 arranged about the concentric rotor assembly 102, the set of sprocket brackets 150 configured to engage with teeth of a sprocket of the bicycle. Additionally, the bicycle propulsion system 100 includes a concentric rotor assembly 102 that: includes a circular outer drive surface 132 and a circular inner retention surface 133, thereby defining surfaces for the retention subassembly to translationally constrain the concentric rotor assembly 102 relative to the chassis assembly 104 and for the drive subassembly to transfer power from the motor 162 to the concentric rotor assembly 102. Furthermore, as shown in FIG. 9, the bicycle propulsion system 100 can include a concentric rotor assembly 102 that further includes: a first rotor element 134 attached to a first sprocket bracket 151 and a second rotor element 136 attached to a second sprocket bracket 152, where the concentric motor 162 assembly defines the circular outer drive surface 132 and the circular inner retention surface 133 during engagement of the first rotor element 134 and the second rotor element 136 in an engaged configuration. Thus, the bicycle propulsion system 100 includes a concentric rotor assembly 102 that can easily be engaged and disengaged from a sprocket of a bicycles and can efficiently and securely transfer power to the sprocket of the bicycles from the drive subassembly and motor 162 of the bicycle propulsion device.

In one implementation, as shown in FIG. 9, the bicycle propulsion system 100 includes a concentric rotor assembly 102 that further includes two approximately semicircular rotor elements attached at one end by a hinge and defining male and female components of a latch 140 on the first rotor element 134 and the second rotor element 136 respectively. Upon engagement of the first rotor element 134 with the second rotor element 136, the first rotor element 134 and the second rotor element 136 define the circular outer drive surface 132 and the circular inner retention surface 133.

In another implementation, the bicycle propulsion system 100 includes a concentric rotor assembly 102 that further includes two approximate semicircular rotor elements that a configured to be fully separable via two latch 140s. Therefore, a user can couple each end of the two rotor elements to the corresponding end of the opposite rotor element, thereby defining the circular outer drive surface 132 and the circular inner retention surface 133.

Additional components and implementations of these components are described in further detail below.

3.1 Concentric Rotor

Generally, the bicycle propulsion system 100 includes a concentric rotor 130 as a primary component of the concentric rotor assembly 102. More specifically, the bicycle propulsion system 100 can include a concentric rotor 130 including a centerless disk defining a circular outer drive surface 132 and defining a circular inner retention surface 133, where the circular outer drive surface 132 defines a toothed (i.e. geared) surface and the circular inner retention surface 133 is characterized by a diameter greater than the bicycle sprocket with which the concentric rotor 130 is configured to engage. Additionally, the bicycle propulsion system 100 can include a concentric rotor 130 that defines a thickness such that the concentric rotor 130 is laterally stable under load when being driven by the drive subassembly and while engaged with a bicycle sprocket, such as a thickness between 0.5 centimeters and 1.5 centimeters.

In one implementation, the concentric rotor 130 is manufactured as a single piece of rigid material before being divided into two or more separate rotor elements. For example, the concentric rotor 130 can be manufactured from a metal such as stainless steel or aluminum alloy (such as 6061 or 7075). For example, the concentric motor 162 can be milled and/or lathed from a single piece of metal. Alternatively, the concentric rotor 130 can be stamped from a single piece of metal. However, the concentric rotor 130 can be manufactured in any other way.

In another implementation shown in FIG. 8, the concentric rotor 130 can include a set of slots in order to reduce the weight of the concentric rotor 130 while leaving sufficient material to maintain structural stability of the concentric rotor 130 under load from the drive subassembly.

3.2 Outer Drive Surface

Generally, the bicycle propulsion system 100 can include a concentric rotor 130 defining a geared outer drive surface 132, in order to interface with the drive subassembly. In one implementation, the bicycle propulsion system 100 can include a concentric rotor 130 configured to interface (i.e. mesh) with a toothed drive belt 164 (i.e. timing belt) housed by the chassis assembly 104. In this implementation, the outer drive surface 132 can define a set of curved teeth configured to interface with a rubber timing belt. Thus, by interfacing with a timing belt, the bicycle propulsion system 100 can reliably transfer power from the motor 162 to the concentric rotor 130 without lubrication or frequency maintenance.

In one implementation, the bicycle propulsion system 100, via the retention subassembly, holds the concentric rotor assembly 102 relative to the chassis assembly 104 with a pair of retaining rollers that ride along the outer drive surface 132. However, in order to prevent damage to the retaining rollers due to impact with the toothed outer drive surface 132, the bicycle propulsion system 100 can include a chamfered edge at the base of the teeth of the outer drive surface 132 configured to engage the retaining rollers of the retention subassembly.

3.3 Inner Retention Surface

Generally, the bicycle propulsion system 100 can include a concentric rotor 130 defining an inner retention surface 133 at along its interior circular edge in order for the retention subassembly of the chassis assembly 104 to translationally constrain the concentric rotor 130 while feeding the concentric rotor 130 through the chassis assembly 104 such that the concentric rotor 130 rotates about its center axis. More specifically, the bicycle propulsion system 100 can include a concentric rotor 130 that defines a smooth inner retention surface 133 configured to engage with inner retaining rotors. Additionally, to prevent procession of the concentric rotor 130 during rotation, the concentric rotor 130 can define a circular inner retention surface 133 that is concentric with the outer drive surface 132 and the rotational axis of the sprocket with which the concentric rotor assembly 102 is configured to engage. In one implementation, the concentric rotor 130 defines an inner retention surface 133 that includes a chamfer corresponding to an interior chamfer of the inner retaining rollers 122 in the retention subassembly.

3.4 Rotor Elements

Generally, as shown in FIGS. 6 and 7, the bicycle propulsion assembly includes a concentric rotor 130 that further includes two (partially or completely) separable rotor elements, each rotor element defining an arc of the complete concentric rotor 130, in order to enable a cyclist to open the concentric rotor 130 around the sprocket of the bicycle and clamp the concentric rotor 130 around this sprocket. More specifically, the concentric rotor assembly 102 includes: a first rotor element 134 attached to a first sprocket bracket 151 configured to engage with a bicycle sprocket; and a second rotor element 136 attached to a second sprocket bracket 152 configured to engage the bicycle sprocket. In one implementation, the concentric rotor assembly 102 includes: a first rotor element 134 attached to a first sprocket bracket 151 in a set of sprocket brackets 150; and a second rotor element 136 attached to a second sprocket bracket 152 in the set of sprocket brackets 150 and configured to transiently couple to the first rotor element 134 to define the circular outer drive surface 132 and the inner retention surface 133. Thus, upon engagement of the first rotor element 134 with the second rotor element 136 (e.g., via latches and/or a hinge), the first rotor element 134 and the second rotor element 136 combine to define the circular outer drive surface 132 and the circular inner retention surface 133.

In one implementation, the bicycle propulsion system 100 can include a concentric rotor 130 manufactured from a single piece of material prior to being cut into a first rotor element 134 and a second rotor element 136, thereby ensuring a precise fit between the first rotor element 134 and the second rotor element 136.

In another implementation, the bicycle propulsion system 100 can include a first rotor element 134 and a second rotor element 136 that are approximately equal in size to ensure approximately equal load is applied to each side of the sprocket of the bicycle via the first sprocket bracket 151 and second sprocket bracket 152 during rotation of the concentric rotor assembly 102.

In yet another implementation, the bicycle propulsion system 100 can include additional rotor elements each attached to corresponding sprocket brackets 150 in order to more fully circumscribe the sprocket of the bicycle with sprocket brackets 150. In this implementation, the set of rotor elements can include multiple latches and/or hinges to enable a user to engage the concentric rotor 130 around the sprocket of the bicycle.

3.4.1. Rotor Hinge and Latch

Generally, as shown in FIG. 9, the bicycle propulsion system 100 can include a set of rotor elements coupled by a rotor hinge 138 at one side of each rotor element and transiently connected, in an engaged configuration, by a latch 140. More specifically, the bicycle propulsion system 100 can include a concentric rotor assembly 102 that further includes: a hinge connecting a first rotor element 134 to a second rotor element 136, the hinge defining a rotational axis parallel to the center axis of the circular outer drive surface 132; a latch 140 inset into the first rotor element 134; and a locking pin within a lot of the second rotor element 136 configured to engage the latch 140 and prevent separation of the first rotor element 134 from the second rotor element 136 in the engaged configuration of the concentric rotor assembly 102. Thus, a user may install and remove the concentric rotor assembly 102 around a sprocket of a bicycle without tools and within a short period of time and, while in the engaged configuration, the concentric rotor assembly 102 remains rigidly engaged around the bicycle sprocket sufficient to transfer torque from the drive subassembly to the sprocket of the bicycle.

The concentric rotor assembly 102 can include a latch 140 inset into a first end of the first rotor element 134 and a latching pin 146 traversing a slot in a second end of the second rotor element 136. Thus, when a user brings the first end of the first rotor element 134 and the second end of the second rotor element 136 together and slots the latch 140 of the first rotor element 134 into the slot in the second rotor element 136, the latch 140 latches around the latching pin 146, thereby preventing disengagement of the first rotor element 134 from the second rotor element 136. Additionally, the concentric rotor assembly 102 can include a latch 140 configured to release a latching pin 146 upon translation of a sliding member 148 mechanically coupled to the latch 140 and configured to enclose the latch 140 inset in the rotor element.

In one implementation, the concentric rotor assembly 102 can include a latch 140 that further includes a spring-loaded linear cam 142 configured to engage with a hooked follower 144, as shown in FIG. 9. FIG. 9 shows the latch 140 in the locked position despite showing the first rotor element 134 and the second rotor element 136 as separated from each other for clarity. Upon engagement of the rotor elements, the hooked follower 144 catches the latching pin 146 on the opposite rotor element and rotates about a follower pin 145 until the linear cam 142 can translate into a slot left by the rotation of the hooked follower 144, thereby preventing back-rotation of the hooked follower 144 and, as a result, prevents disengagement of the latching pin 146 from the hooked follower 144. The latch 140 can also include sliding member 148 (not shown for clarity in FIG. 9) that is mechanically coupled to the linear cam 142 to enable the hooked follower 144 to back rotate such that, upon application of a force separating the first rotor element 134 from the second motor 162, the latching pin 146 can be removed from the hook of the hooked follower 144 as the hooked follower 144 back-rotates.

In another implementation, the concentric rotor assembly 102 is configured to cooperate within the chassis assembly 104 in order to hide the latch 140 within the chassis assembly 104, thereby preventing access to the latch 140 and effectively locking the concentric rotor assembly 102 around the sprocket of the bicycle for the purpose of theft prevention. More specifically, in this implementation, the chassis assembly 104 can include a solenoid, or another electromechanical latch within the chassis assembly 104, configured to engage with a corresponding slot, an indentation, or the outer drive surface 132 of the concentric rotor 130 such that, while the solenoid or latch is engaged, the concentric rotor is locked in place and the latch 140 is concealed by the chassis assembly 104 (i.e., the outboard frame 114). Additionally, the latch or solenoid can be actuated by a physical key or via wireless communication with an application executing a mobile computation device of the cyclist in order to engage and remove the latch or solenoid from the slot of the concentric rotor 130, thereby enabling the concentric rotor 130 to freely rotate again. Furthermore, the bicycle propulsion system 100 can: store a predefined position of the concentric rotor for which the latch 140 (and sliding member 148) is blocked against the interior surface of the outboard frame 14; and, in response to receiving a command to lock bicycle propulsion system 100 to the bicycle, the bicycle propulsion system can actuate the motor 162 to move the concentric rotor assembly 102 into the predefined position and engage an electromechanical pin preventing rotation of the concentric rotor 102. Therefore, the bicycle propulsion system 100 can be locked to the frame of the bicycle remotely without physical intervention by a user.

In yet another implementation, the bicycle propulsion system 100 can include other locking mechanisms such as integrated U-locks, cable locks, or folding locks configured to secure the concentric rotor assembly 102 and/or the chassis assembly 104 to the frame or wheel of the bicycle. Additionally, the bicycle propulsion system 100 can include a GPS chip and an inertial measurement unit and can, while the bicycle is not in use (or upon activation of this security feature via mobile computational device of a user): detect movement of the bicycle and/or the bicycle propulsion system 100; and transmit the GPS location of the bicycle propulsion system to a mobile computational device of the user. Thus, the concentric rotor assembly 102 can define security features configured to prevent removal of the concentric rotor 130 from the sprocket and/or removal of the chassis assembly 104 from the bicycle.

However, the concentric rotor assembly 102 can include any type of latch 140 capable of securing the first rotor element 134 to the second rotor element 136 when engaged with the sprocket of the bicycle and under load by the drive subassembly.

3.5 Sprocket Brackets

Generally, as shown in FIG. 11, the concentric rotor assembly 102 can include a set of sprocket brackets 150 configured to engage with teeth of a bicycle sprocket such that torque applied to the concentric rotor 130 is transferred to the sprocket of the bicycle. More specifically, the concentric rotor assembly 102 can further include a set of sprocket brackets, each sprocket bracket defining: a set of outboard retaining teeth 154 configured to engage the outer surface of the sprocket of the bicycle; a set of inboard retaining teeth 155 offset from the outboard retaining teeth

154 by greater than the thickness of the sprocket of the bicycle and configured to engage the inner surface of the sprocket of the bicycle; and a set of engagement features 156 configured to engage with pitches of the sprocket of the bicycle arranged between the set of outboard retaining teeth 154 and the set of inboard retaining teeth 155. Thus, the concentric rotor assembly 102 can engage with a sprocket of a bicycle via the set of sprocket brackets 150.

The sprocket bracket can define a set of engagement features 156 that are configured to sit within the pitches (i.e. between the teeth or spurs) of the bicycle sprocket when the sprocket bracket is engaged with the sprocket of the bicycle. Therefore, the sprocket bracket can define engagement features 156 that include a series of half-cylindrical spurs mimicking one side of the rivets of a bicycle chain. In one implementation, the sprocket bracket can define engagement features 156 that include a series of half-cylindrical spurs that are characterized by a diameter less than the diameter of bicycle chain rivets configured to engage the bicycle sprocket. By including slightly smaller diameter engagement features 156 than the rivets of a bicycle chain matched to the bicycle sprocket, the sprocket bracket can more easily be installed onto the bicycle sprocket.

Additionally, the sprocket bracket can define a set of inboard retaining teeth 155 and outboard retaining teeth 154 on either side of the engagement features 156 in order to prevent lateral disengagement of the sprocket bracket from the sprocket of the bicycle (e.g., due to non-axial torque applied to the concentric rotor assembly 102). Therefore, the sprocket bracket can include inboard retaining teeth 155 and outboard retaining teeth 154 characterized by a thickness less than the intra-sprocket spacing of the cogset of the bicycle. Furthermore, the sprocket bracket can include inboard retaining teeth 155 and outboard retaining teeth 154 that alternate on either side of the engagement features 156 in order facilitate engagement of the sprocket bracket with the sprocket of the bicycle by a user of the bicycle propulsion system 100, as shown in FIG. 11.

The concentric rotor assembly 102 can include a set of sprocket brackets 150 with engagement features 156, inboard retaining teeth 155, and outboard retaining teeth 154, configured to engage with a sprocket of a particular size (i.e. number of teeth), with a sprocket configured for a particular chain standard (e.g., half-inch pitched chain, eighth-inch chain, three-sixteenths-inch chain, 5.3-millimeter chain, 5.5-millimeter chains, six-millimeter chain, 6.5-millimeter chain, and/or seven-millimeter chain), and with a sprocket characterized by a particular sprocket spacing. Thus, the sprocket bracket can define engagement features 156, inboard retaining teeth 155, and outboard retaining teeth 154, characterized by dimensions corresponding to the sprocket of the bicycle with which the sprocket bracket is configured to engage.

In one implementation, each sprocket bracket in the set of sprocket brackets 150 defines an engagement arc characterized by a radius equal to or greater than the pitch radius of the sprocket of the bicycle with which the sprocket bracket is configured to engage. Thus, the curvature of each sprocket bracket in the set of sprocket brackets 150 approximately matches the curvature of the bicycle sprocket with which the sprocket bracket is configured to engage.

In another implementation, the concentric rotor assembly 102 can also include a set of sprocket brackets 150 that define a total arc length that is greater than 25% of the pitch circumference of the bicycle sprocket. Thus, in implementations of the concentric rotor assembly 102 that include a first sprocket bracket 151 and a second sprocket bracket 152, the first sprocket bracket 151 and the second sprocket bracket 152 can be configured to engage with greater than twenty five percent of teeth of the first bicycle sprocket in the engaged configuration of the concentric rotor assembly 102. For example, the concentric rotor assembly 102 can include a first sprocket bracket 151 attached to a first rotor element 134 and a second sprocket bracket 152 attached to a second rotor element 136 configured to engage a sprocket defining 28 teeth. In this example, the first sprocket bracket 151 and the second sprocket bracket 152 together define an arc length and engagement features 156 configured to engage with at least seven teeth of the sprocket.

In yet another implementation, the concentric rotor assembly 102 can include a set of sprocket brackets 150 that define a total arc length less than sixty percent of the pitch circumference of the bicycle sprocket. In this implementation, the set of sprocket brackets 150 can engage with less than 60% of the teeth of the bicycle sprocket. For example, the concentric rotor assembly 102 can include a first sprocket bracket 151 attached to a first rotor element 134 and a second sprocket bracket 152 attached to a second rotor element 136 configured to engage a sprocket defining 28 teeth. In this example, the first sprocket bracket 151 and the second sprocket bracket 152 together define an arc length and engagement features 156 configured to engage with sixteen or fewer teeth of the sprocket.

Figure 5:
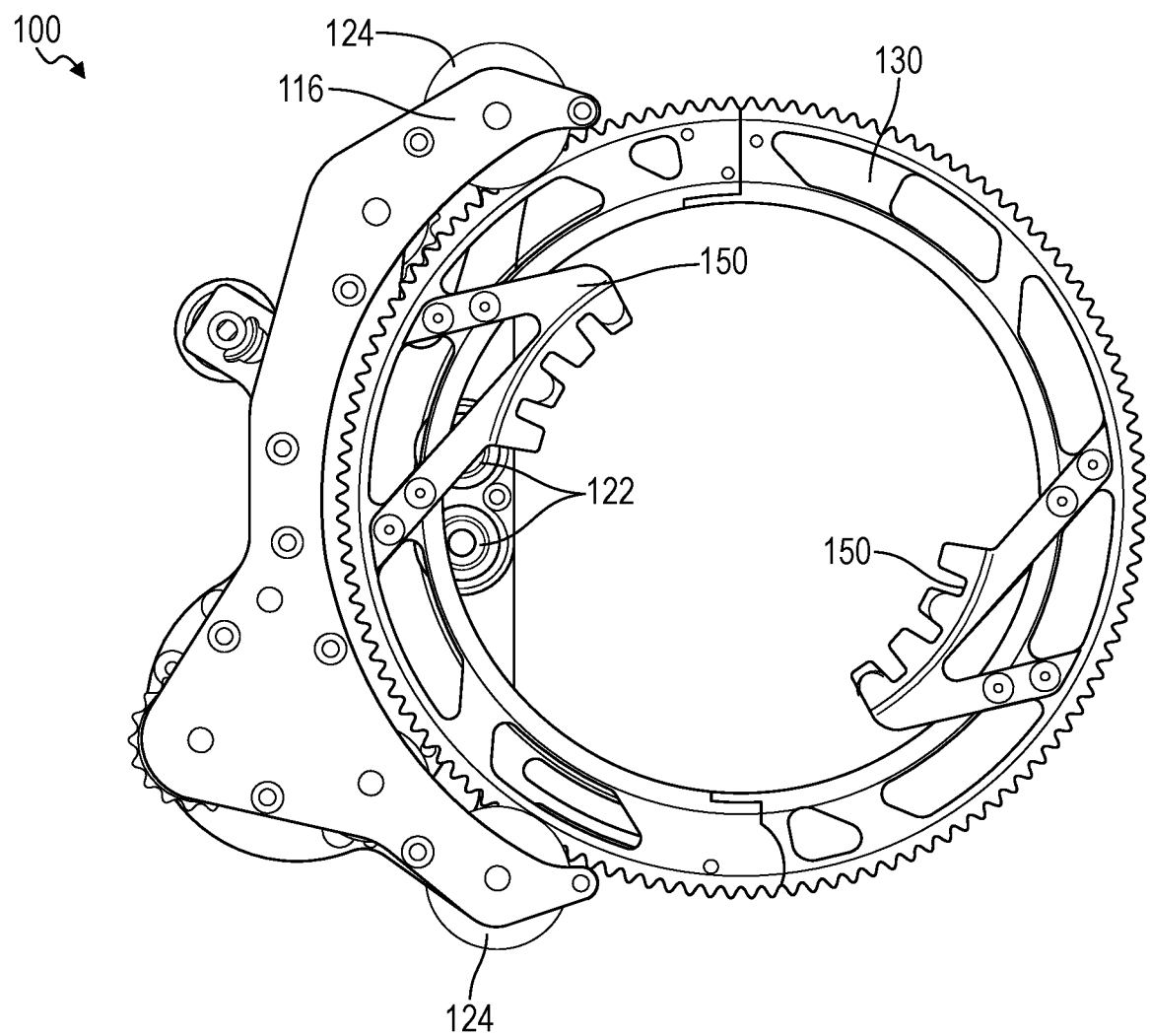
FIG. 5 is a schematic representation of the system.

Generally, each sprocket bracket in the set of sprocket brackets 150 attaches to a corresponding rotor element via a set of sprocket struts configured to secure to a face of the concentric rotor 130, as shown in FIG. 5. In one implementation, the set of sprocket struts define a set of threaded bores aligned with threaded bores inset into a face of the concentric rotor 130, as shown in FIG. 11. Thus, the set of sprocket brackets 150 are replaceable and/or exchangeable by a user of the bicycle propulsion system 100.

In one implementation, the concentric rotor assembly 102 includes a set of sprocket brackets 150 configured to engage with an innermost bicycle sprocket in a bicycle cogset (e.g., the largest-diameter sprocket in the cogset). More specifically, in implementations of the bicycle propulsion system 100 including a first sprocket bracket 151 and a second sprocket bracket 152: the first sprocket bracket 151 is further configured to engage with an innermost bicycle sprocket in a bicycle cogset; the second sprocket bracket 152 is further configured to engage the innermost bicycle sprocket; and the concentric rotor assembly 102 is further configured to transiently engage around the innermost bicycle sprocket of the bicycle via the first sprocket bracket 151 and the second sprocket bracket 152 in the engaged configuration of the concentric rotor assembly 102; the retention subassembly is further configured to translationally constrain the concentric rotor assembly 102 relative to the chassis assembly 104 while the concentric rotor assembly 102 is engaged around the innermost bicycle sprocket and the chassis assembly 104 is secured to the bicycle frame element; and the motor 162 is further configured to rotate the concentric rotor assembly 102 about the center axis of the circular outer drive surface 132 via the drive subassembly, the motor 162 causing rotation of the innermost bicycle sprocket while the concentric rotor assembly 102 is engaged around the second bicycle sprocket. Thus, the concentric rotor assembly 102 can include a set of sprocket brackets 150 configured to attach to the inboard side of the concentric rotor 130 to avoid interference with other sprockets of the bicycle and defining a curve back outward such that the engagement features 156 are located between planes defined by the inboard and outboard faces of the concentric rotor 130, as shown in FIG.

10. In this implementation, the set of sprocket brackets 150 can define filleted edges to reduce force concentration in each sprocket bracket.

The set of sprocket brackets 150 can be manufactured from any hardwearing and lightweight material capable of transferring torque from the concentric rotor 130 to the sprocket of the bicycle, such as aluminum or steel. The set of sprocket brackets 150 can be manufactured via stamping milling, additive manufacturing, or any other manufacturing techniques.

3.5.1 Sprocket Bracket Kit

In one implementation, the bicycle propulsion system 100 includes multiple sets of sprocket brackets 150, each set configured to engage with a different type of bicycle sprocket (e.g., for sprockets defining a different number of teeth or in compliance with a different standard). More specifically, in implementations of the bicycle propulsion system 100 including a first sprocket bracket 151 and a second sprocket bracket 152 in a first set of sprocket brackets 150: the first sprocket bracket 151 is further configured to engage the first bicycle sprocket, the first bicycle sprocket characterized by a first number of teeth; the second sprocket bracket 152 is further configured to engage the first bicycle sprocket, the first bicycle sprocket characterized by the first number of teeth. The bicycle propulsion system 100 can further include: a third sprocket bracket configured to attach to the first rotor element 134 in replacement of the first sprocket bracket 151 and configured to engage with a second bicycle sprocket, the second bicycle sprocket characterized by a second number of teeth different from the first number of teeth; and a fourth sprocket bracket configured to attach to the second rotor element 136 in replacement of the second sprocket bracket 152; and configured to engage the second bicycle sprocket the second bicycle sprocket characterized by the second number of teeth. In this implementation of the bicycle propulsion system 100: the concentric rotor assembly 102 is further configured to transiently engage around the second bicycle sprocket in the engaged configuration of the concentric rotor assembly 102 via the third sprocket bracket and the fourth sprocket bracket; the retention subassembly is further configured to translationally constrain the concentric rotor assembly 102 relative to the chassis assembly 104 while the concentric rotor assembly 102 is engaged around the second bicycle sprocket and the chassis assembly 104 is secured to the bicycle frame element; and the motor 162 is further configured to rotate the concentric rotor assembly 102 about the center axis of the circular outer drive surface 132 via the drive subassembly, the motor 162 causing rotation of the second bicycle sprocket while the concentric rotor assembly 102 is engaged around the second bicycle sprocket. Thus, the bicycle propulsion system 100 can include a kit of sprocket brackets 150 including multiple sets of sprocket brackets 150, where each set is configured to engage with a particular type of cogset. The bicycle propulsion system 100 can therefore engage with a number of different types of cogsets defining varying numbers of teeth, chain standards, or sprocket spacing by exchanging one set of sprocket brackets 150 for another set of sprocket brackets 150.

4. Chassis Assembly

Generally, as shown in FIGS. 3, 4, 5, 6, and 7, the bicycle propulsion system 100 includes a chassis assembly 104 that: houses the retention subassembly that translationally constrains the concentric rotor assembly 102 relative to the chassis assembly 104; houses the drive subassembly that is configured to transfer power from the motor 162 to the concentric rotor assembly 102; houses the electronics subsystem 180 that controls the motor 162 and executes pedal assist and safety processes; and secures the bicycle propulsion system 100 to the frame of the bicycle in order to prevent rotation of the system relative to the frame of the bicycle while the concentric rotor assembly 102 is in the engaged configuration. More specifically, the bicycle propulsion system 100 includes a chassis assembly 104: configured to transiently secure to a stay of the bicycle; comprising a retention subassembly configured to translationally constrain the concentric rotor assembly 102 relative to the chassis assembly 104; comprising a drive subassembly configured to engage the circular outer drive surface 132 of the concentric rotor assembly 102; and a motor 162 configured to rotate the concentric rotor assembly 102 about a center axis of the circular outer drive surface 132 via the drive subassembly. Additionally, in implementations where the bicycle propulsion system 100 secures to another frame element of the bicycle, the bicycle propulsion system 100 includes a chassis assembly 104: configured to transiently secure to a bicycle frame element; comprising a retention subassembly configured to translationally constrain the concentric rotor assembly 102 relative to the chassis assembly 104 while the concentric rotor assembly 102 is engaged around the first bicycle sprocket and the chassis assembly 104 is secured to the bicycle frame element; comprising a drive subassembly configured to engage the concentric rotor assembly 102 via the circular outer drive surface 132; and comprising a motor 162 configured to rotate the concentric rotor assembly 102 about a center axis of the circular outer drive surface 132 via the drive subassembly, the motor 162 causing rotation of the first bicycle sprocket while the concentric rotor assembly 102 is engaged around the first bicycle sprocket. Thus, the chassis assembly 104 houses and locates the motor 162, the drive subassembly, and the retention subassembly such that the motor 162 transfers torque to the concentric rotor assembly 102 via the drive belt 164. The concentric rotor assembly 102 then transfers this torque to the sprocket via the set of sprocket brackets 150, thereby assisting the cyclist in applying torque to the sprocket of the bicycle.

The chassis assembly 104 includes a chassis that houses the retention subassembly, the drive subassembly, the motor 162, and the electronics subsystem 180. The chassis assembly 104 can include a chassis configured to house the abovementioned subassemblies and subsystems within a form factor that fits within the chain stay and/or seat stay of most bicycles.

In one implementation, as shown in FIGS. 3, 4, 5, 6, and 7, the chassis includes: an outboard frame 114; an outboard frame 114 parallel to the inboard frame 116; an electronics housing; and a motor cowling 113. In this implementation, the outboard frame 114 and the inboard frame 116 are separated by a set of standoffs 118 fastened to the outboard frame 114 and the inboard frame 116 via a set of threaded bores in the outboard frame 114 and the inboard frame 116. Thus, the outboard frame 114 and the inboard frame 116 contain the retention subassembly and the drive subassembly between them. In this implementation, the electronics subsystem 180 and motor 162 are attached outboard of the outboard frame 114 and are housed within the electronics housing and motor cowling 113 respectively. Thus, the chassis assembly 104 can define distinct regions for the mechanical and electronic components of the bicycle propulsion system 100.

The chassis assembly 104 can include an outboard frame 114 and an inboard frame 116 stamped from aluminum, steel or any other rigid material in order to support the retention subassembly and the drive subassembly. The chassis assembly 104 can also include an outboard frame 114 and an inboard frame 116 that define attachment points for the axles of rollers and gears (from the retention subassembly and the drive subassembly) and the motor 162 axle, thereby locating each of these components relative to each other. The chassis assembly 104 can also include an outboard frame 114 that further defines attachment points for the motor 162, the electronics subsystem 180, the electronics housing and the motor cowling 113. In one implementation, the chassis assembly 104 can include an outboard frame 114 that includes an attachment point for a sensor arm 171. In another implementation, the chassis assembly 104 can include an outboard frame 114 defining a derailleur stop 115, configured to extend into the path of a derailleur of the bicycle, shown in FIGS. 3, 4, and 5, in order to prevent the derailleur of the bicycle from shifting the bicycle chain into the sprocket with which the concentric rotor 130 is engaged, thereby preventing physical interference between the derailleur of the bicycle and/or the chain of the bicycle with the bicycle propulsion system 100. Thus, the chassis assembly 104 includes comprises a derailleur stop 115 configured to prevent a derailleur of the bicycle from shifting into the first bicycle sprocket.

The chassis assembly 104 can include an electronics housing manufactured from a hard plastic or other rigid, non-conductive material in order to prevent dirt and/or water ingress to the electronics subsystem 180 housed by the electronics housing, while also enabling wireless communication between the electronics subsystem 180 and a personal computing device of a user. The chassis assembly 104 can include an electronics housing manufactured via molding (e.g., injection molding) or additive manufacturing processes.

The chassis assembly 104 can also include a motor cowling 113 configured to surround the motor 162 and prevent physical damage to the motor 162 upon incidental impact. The motor 162 itself can include an additional waterproof housing separate from the motor cowling 113. In one implementation, the chassis assembly 104 includes a single plastic member that functions as both the electronics housing and the motor cowling 113.

The chassis assembly 104 also includes an attachment mechanism configured to transiently secure the chassis assembly 104 to a frame element of the bicycle in order to prevent rotation of the chassis assembly 104 about the concentric rotor assembly 102, upon application of torque to the concentric rotor assembly 102 by the chassis assembly 104. In one implementation, the chassis assembly 104 includes an attachment mechanism configured to attach the chassis assembly 104 to the drive-side chain stay of the bicycle. In this implementation, the motor 162 and motor cowling 113 can be positioned below the attachment mechanism such that, while the bicycle propulsion system 100 is engaged with the bicycle, the motor 162 and motor cowling 113 can extend outboard from the outboard frame 114 beneath the drive side chain stay of the bicycle. In this implementation, the chassis assembly 104 can include a flexible rubber or fabric strap configured to wrap around the chain stay of the bicycle and connect to the outboard face of the chassis assembly 104. However, the chassis assembly 104 can include other types of attachment mechanisms such as a clamp- or latch-based attachment mechanism.

4.1 Retention Subassembly

Generally, as shown in FIG. 6, the chassis assembly 104 includes a retention subassembly that further includes a set of inner retaining rollers 122 and a set of outer retaining rollers 124 configured to locate the concentric rotor assembly 102 within the chassis assembly 104 such that the drive belt 164 engages the outer drive surface 132 of the concentric rotor assembly 102 while also enabling the concentric rotor 130 to rotate about its center axis (e.g., as a hub-less wheel) when torque is applied to the concentric rotor via the drive belt 164. More specifically, the chassis assembly 104 includes a retention subassembly further including a set of retaining rollers configured to translationally constrain the concentric rotor 130 subsystem as a hub-less wheel via contact with the inner retention surface 133 and the circular outer drive surface 132. Additionally, the chassis assembly 104 can include a retention subassembly that does not interfere with the teeth on the outer drive surface 132 of the concentric rotor assembly 102, thereby reducing wear on and excess noise produced by the retention subassembly during operation of the bicycle propulsion system 100. Furthermore, the chassis assembly 104 can include a retention subassembly that enables removal of the concentric rotor assembly 102 from the chassis assembly 104 such that a user may perform maintenance on the mechanical components of the bicycle propulsion system 100.

The retention subassembly includes a set of inner retention rollers configured to ride along the inner retention surface 133 of the concentric rotor assembly 102 without interfering with the set of sprocket brackets 150 arranged about the inner retention surface 133 of the concentric rotor assembly 102. In one implementation, the retention subassembly includes two inner retention rollers to constrain (in combination with the set of outer retention rollers) the concentric rotor assembly 102 in two dimensions coplanar with the rotational plane of the concentric rotor assembly 102. In another implementation, the retention subassembly includes inner retention rollers defining a slotted outer surface and defining a chamfer on either side of the slotted surface such that the inner retention rollers fit across the corresponding inner retention surface 133 of the concentric rotor assembly 102, thereby laterally constraining the concentric rotor assembly 102 within the slotted surfaces of the retention rollers. In this implementation, the retention subassembly can include a set of retention rollers defining asymmetrical slots such that the inboard side of the retention rollers in the set of retention rollers can clear the sprocket brackets 150 attached on the inboard side of the concentric rotor assembly 102.

The retention subassembly includes a set of outer retention rollers configured to ride along a chamfered edge of the outer drive surface 132 of the concentric rotor assembly 102. Thus, the retention subassembly contains the concentric rotor assembly 102 between the set of outer retention rollers and the set of inner retention rollers. In one implementation, the retention subassembly includes a set of outer retention rollers including two outer retention rollers. In another implementation, the retention subassembly can include a set of outer retention rollers can define a slotted outer surface such that the teeth of the outer drive surface 132 do not come into contact with the outer retention rollers and instead the outer retention rollers contact the chamfered surface of the concentric rotor assembly 102.

In one implementation, the retention subassembly includes rollers manufactured from polyoxymethylene, molybdenum-disulfide-filled nylon, or any other hardwearing plastic.

4.2 Drive Subassembly

Generally, as shown in FIG. 6, the chassis assembly 104 includes a drive subassembly, in order to transfer torque and power from the motor 162 to the concentric rotor assembly 102. More specifically, the chassis assembly 104 can include a drive subassembly that further includes: a drive gear 166 coupled to the motor 162; a drive belt 164 configured to engage the drive gear 166 and the circular outer drive surface 132 of the concentric rotor assembly 102; and a set of drive belt rollers 168 configured to maintain engagement of the drive belt 164 with the drive gear 166 and with the outer drive surface 132 of the concentric rotor assembly 102. Thus, the drive subassembly, by including the drive belt 164 as the primary wear component of the bicycle propulsion system, can operate with no grease, thereby reducing maintenance overhead, while producing less noise when compared to a chain or meshed gear transmission system. Additionally, the drive belt 164 can be easily removed from the drive gear 166 and drive belt rollers 168 and replaced further improving the serviceability of the bicycle propulsion system 100.

The drive subassembly can include a drive gear 166 that shares an axle with the motor 162 and functions to transfer power to the drive belt 164. The drive belt 164 is then directed within the confines of the inboard frame 116 and the outboard frame 114, via the set of drive belt rollers 168, to conform with an arc of the outer drive surface 132 of the concentric rotor assembly 102, while the concentric rotor assembly 102 is engaged with the chassis assembly 104. In one implementation a first pair of drive belt rollers 168 located proximal to the drive gear 166 maintain tension in the drive belt 164 around the drive gear 166 while a third drive belt roller 168 extends the drive belt 164 toward an upper side of the chassis assembly 104 such that the drive belt 164 meshes with the outer drive surface 132 of the concentric rotor assembly 102 over a large arc, thereby distributing torque transfer across a longer length of the drive belt 164 in order to further reduce maintenance frequency of the bicycle propulsion system. In another implementation, the drive subassembly can include a set of drive rollers 168 defining a smooth outer surface and configured to engage the smooth side of the drive belt 164 in order to direct the drive belt 164 around the drive gear 166 and around the outer drive surface 132 of the concentric rotor assembly 102.

The drive subassembly can include a geared jockey (or idler) pulley configured to redirect and tension a section of the drive belt 164 between the pair of drive rollers 168 proximal to the drive gear 166 and the drive roller located on the upper end of the chassis assembly 104. In implementations where the chassis assembly 104 defines a different form factor than the form factor shown in FIGS. 3, 4, 5, 6, and 7, the drive subassembly can include different and/or additional drive rollers 168 and/or jockey pulleys 169 in order to position the drive belt 164 around the drive gear 166 and around a portion of the outer drive surface 132 of the concentric rotor assembly 102.

In one implementation, the drive belt 164 includes a timing belt. Alternatively, the drive subassembly can include a friction belt. In this implementation, the drive gear 166 is replaced with a drive wheel, and the drive rollers 168 and jockey wheel are configured to increase the tension in the friction belt when compared to the timing belt.

In another implementation, the drive subassembly can include a planetary gearbox arranged between the motor and the drive gear 166 and configured to transfer torque between the drive gear 166 and the motor 162, thereby reducing backlash between the drive gear 166 and the motor 162. In this implementation, the planetary gearbox can be configured with the drive gear 166 as the sun gear in the planetary gearbox. Alternatively, the planetary gearbox can be configured with the drive gear as the ring gear in the planetary gearbox.

In yet another implementation, the drive subassembly can include a gearbox (e.g., a planetary gearbox) in replacement of the drive-belt-based system described above. In this implementation, the drive subassembly can include a gearbox arranged, within the chassis assembly 104, between the drive gear 166 and the outer drive surface 132, when the bicycle propulsion system 100 is in the engaged configuration. In one example, the drive subassembly can include a planetary gearbox (e.g., a single stage planetary gearbox), where the drive gear 166 is configured as a sun gear in the planetary gearbox and the carrier of the planetary gearbox is configured to transfer torque to the outer drive surface 132 (e.g., via a toothed concentric surface). In another example, the drive subassembly can include a planetary gearbox, where the drive gear 166 is configured as a sun gear in the planetary gearbox and the ring gear of the planetary gearbox is configured to transfer torque to the outer drive surface 132 of the concentric rotor assembly 102.

However, the drive subassembly can include additional components configured to transfer torque between the motor 162 and the concentric rotor assembly 102 via the outer drive surface 132.

4.3 Motor

Figure 4:
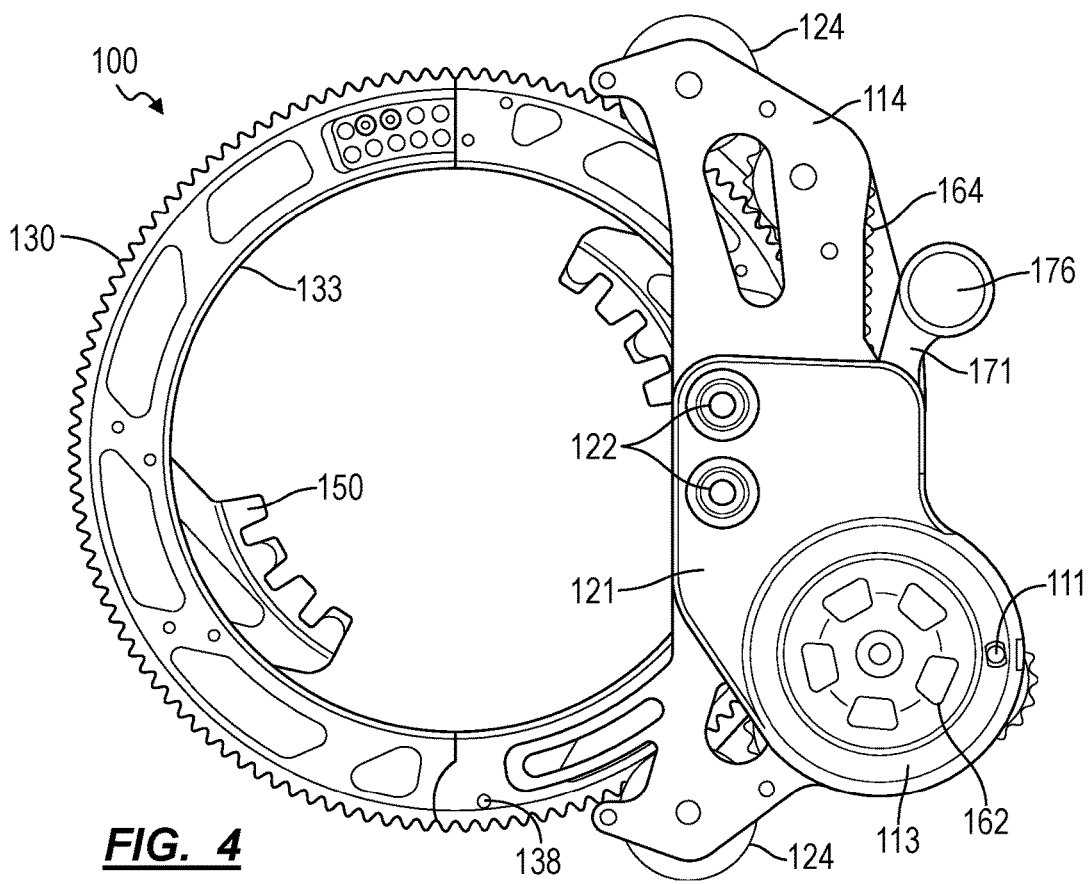
FIG. 4 is a schematic representation of the system.

Generally, as shown in FIGS. 3, 4, and 7, the chassis assembly 104 includes a motor 162 configured to transfer torque to the drive subassembly via the drive gear 166, which then transfers torque to the concentric rotor assembly 102, causing rotation of the concentric rotor assembly 102 and, therefore, the sprocket to which the concentric rotor assembly 102 is engaged. In one implementation, the motor 162 includes a compact electric motor 162, such as a radial flux or axial flux motor 162.

The motor 162 can be coupled to the outboard frame 114 of the chassis assembly 104, thereby preventing interference between the motor 162 and the wheel of the bicycle. The motor 162 also includes an output shaft extending through the outboard frame 114 into the internal volume of the chassis assembly 104. This output shaft is coupled to the drive gear 166 of the drive subassembly and transfers power to the drive belt 164.

In one example, the motor 162 is characterized by a peak power output of greater than 1000 watts and characterized by a sustained power output of 350 watts in order to sufficiently augment the power of the cyclist over a sustained period of time. Additionally or alternatively, the chassis assembly 104 can include a motor 162 that is electronically limited (e.g., to an output of 350 watts) in order to comply with regional government regulations for motorized vehicles.

In one implementation, the chassis assembly 104 includes a clutch interposed between and configured to selectively engage the output shaft and the drive gear 166 of the drive subassembly. In this implementation, the bicycle propulsion system 100 can engage the clutch upon activation of the motor 162 and can disengage the clutch upon deactivation of the motor 162, or while coasting, in order to reduce friction on the drive train in these circumstances due to internal resistance of the motor 162 to free rotation of the output shaft. The cutch can also be configured to disengage the output shaft and the drive gear 166 by default, thereby limiting motor drag on the rear wheel when the bicycle propulsion system 100 is off or when the battery assembly 106 is discharged.

4.4 Sensor Subassembly

Generally, as shown in FIGS. 3, 4, 12A and 12B, the chassis assembly 104 can include a sensor subassembly 170 configured to detect power applied to the bicycle by the cyclist during operation of the bicycle propulsion system 100, thereby enabling the electronics subsystem 180 to execute closed-loop control of the motor 162 in order to assist the cyclist in propelling the bicycle based on the current effort of the cyclist. In one implementation, the sensor subassembly 170 includes a sensor arm 171 attached to a chain roller 176 configured to measure tension in the chain of the bicycle. In another implementation, the sensor subassembly 170 is integrated into the motor 162 housing and configured to measure the pressure of the motor 162 housing against a chain stay of the bicycle.

In addition to the implementations described below, the sensor subassembly 170 can estimate the power input to the bicycle by the cyclist in any other way (such as by utilizing a separate power communicating with the bicycle propulsion system 100).

4.4.1 Sensor Arm

In one implementation shown in FIGS. 12A and 12B, the sensor subassembly 170 can include a sensor arm 171 configured to: extend from the chassis assembly 104 to the chain of the bicycle; include a chain roller 176 configured to engaged with the chain of the bicycle; and configured to deflect based on the tension in the chain of the bicycle. More specifically, the sensor subassembly 170 includes a sensor arm 171 configured to engage with a bicycle chain via a chain roller 176 biased against the chain of the bicycle while the concentric rotor assembly 102 is engaged around the first bicycle sprocket and the chassis assembly 104 is secured to the bicycle frame element; and an electronics subsystem 180 configured to detect deflection of the sensor arm 171 caused by tension in the bicycle chain and activate the motor 162 to rotate the concentric rotor 130 based on the deflection of the sensor arm 171. Thus, the sensor subassembly 170 can detect the tension in the chain of the bicycle such that the electronics subsystem 180 can estimate an applied power by the cyclist based on this detected tension, and execute closed-loop control of the motor 162 based on this estimated power.

In one implementation, the sensor subassembly 170 includes a sensor arm 171 that is biased against the chain of the bicycle by a spring at one end and engages with the chain with a chain roller 176 at the opposite end. More specifically, the sensor subassembly 170 includes: a chain roller 176 coupled to the sensor arm 171 at a first end; and a biasing spring coupled to a second end of the sensor arm 171 and the chassis assembly 104 and configured to bias the chain roller 176 against the chain of the bicycle. Thus, the sensor assembly includes a sensor arm 171 configured as a lever with a sensor arm 171 axle as a fulcrum with a spring attached at one end of the sensor arm 171 biasing the opposite end toward the chain of the bicycle.

Figure 13:
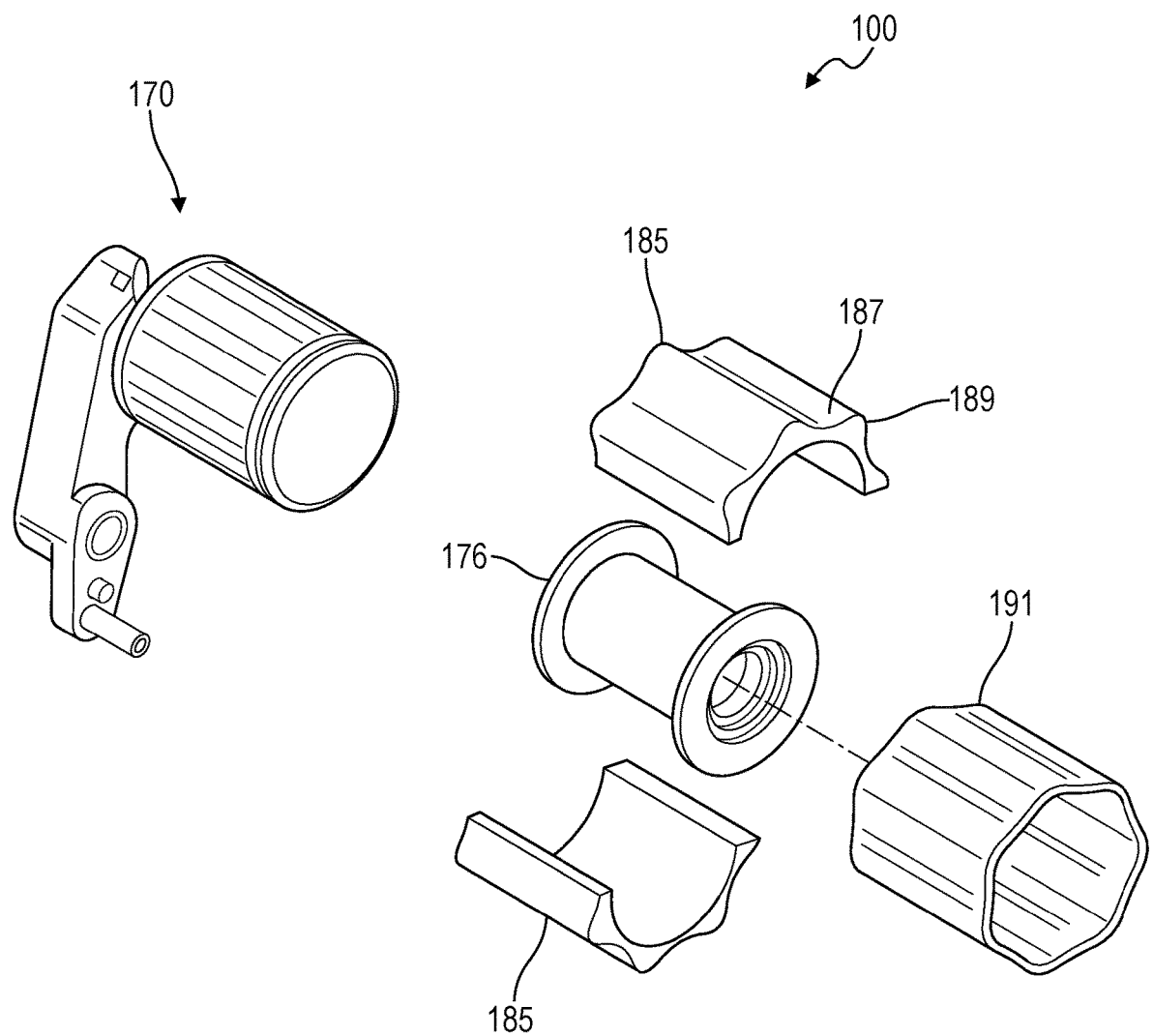
FIG. 13 is a schematic representation of the system.

The sensor subassembly 170 further includes a chain roller 176 in order to engage with the chain and ensure that deflection of the sensor arm 171 is not due to the shape of the chain and is instead caused by the tension in the chain. Thus, the chain roller 176 can define a pitched surface configured engage the links of the chain to reduce periodic deflection of the chain roller 176 as the chain roller 176 rolls along the chain. As shown in FIG. 13, the chain roller 176 can define a pitched surface and is constructed from: a set of pitched shells 185 installed around the roller axle, the pitched shells defining a series of valleys 187 and peaks 189, where the distance between consecutive valleys and consecutive peaks is equal to the pitch of the bicycle chain. Additionally, the chain roller 176 can include a rubber sleeve 191 configured to be tensioned around the outside surface of the installed pitched shells 185.

As shown in FIG. 2, the sensor subassembly 170 can include a chain roller 176 that is biased downward toward the chain such that the angle α is less than 180 degrees. Additionally, the sensor subassembly 170 can include a chain roller 176 that extends across the full length of the cogset of the bicycle to ensure contact with the chain irrespective of the current gear selection of the cyclist. Due to the changes in the angle of the chain of the bicycle dependent on the current gear selection, the sensor assembly can be configured to remain biased against the chain for the full range of possible chain angles corresponding to the full range of possible gear selections for a typical bicycle (e.g., an 8-speed, 9-speed, 10-speed, 11-speed, 12 speed and/or a 13-speed system).

In one implementation, shown in FIGS. 12A and 12B, the sensor assembly includes a sensor arm 171 further including a pivot 178 attached to an axle of the chain roller 176, where the pivot 178 is configured to bias the chain roller 176 against the chain of the bicycle and position the roller axle 177 perpendicular to the chain of the bicycle in a first position (shown in FIG. 12A); and configured to remove the chain roller 176 from the chain of the bicycle in a second position (shown in FIG. 12B). Thus, during installation of the bicycle propulsion system 100 by a user, the user may fold the chain roller 176 such that the roller axle 177 is coplanar with the outboard frame 114 of the chassis assembly 104, thereby facilitating installation by preventing the chain roller 176 from being caught on the chain while the bicycle propulsion system 100 is moved into position at the chain stay of the bicycle.

In another implementation, the sensor assembly can include a sensor arm 171 further including: a chain roller 176 coupled to the sensor arm 171 at a first end; and a magnet 175 coupled to a second end. In this implementation, the electronics subsystem 180 (further described below) includes a Hall effect sensor proximal to the second end of the sensor arm 171 and is configured to detect deflection of the sensor arm 171 via the Hall effect sensor based on displacement of the magnet 175. Thus, by the inclusion of a magnet 175 at one end of the sensor arm 171, the bicycle propulsion system 100 can measure the deflection of sensor arm 171 due to tension in the chain of the bicycle via one or more Hall effect sensors arranged within the electronics subsystem 180 proximal to the second end of the sensor arm 171.

4.4.2 Pressure Sensor

In one implementation, the sensor assembly includes a pressure sensor integrated into the top side of the motor cowling 113 or electronics housing and configured to measure the pressure applied by the bicycle propulsion system 100 on the chain stay of the bicycle. Due to the arrangement of the motor cowling 113 below the chain stay of the bicycle in this implementation, an increase in torque applied by the motor 162 compared to torque applied by the cyclist increases the pressure exerted by the chassis assembly 104 on the chain stay. Therefore, by measuring the pressure in this location, the bicycle propulsion system 100 can correlate this pressure with the power input to the bicycle by the cyclist and adjust the power of the motor 162 accordingly.

4.5 Electronics Subsystem

Generally, as shown in FIG. 7, the chassis assembly 104 includes an electronics subsystem 180 that can further include a controller, a 6-axis inertial measurement unit (or a 3-axis accelerometer and a 3-axis gyroscope), and/or a set of Hall effect sensors. Thus, the electronics subsystem 180 can regulate power from the battery assembly 106 to the motor 162 in order to selectively apply torque to the sprocket of the bicycle in response to riding conditions detectable by the inertial measurement unit and the set of Hall effect sensors in cooperation with the sensor subassembly 170. Additionally, the electronics subsystem 180 can measure the orientation of the chassis assembly 104 relative to the ground and estimate the speed of the bicycle in order to identify whether the bicycle propulsion system 100 is operating with its safe operational envelope. Furthermore, the electronics subsystem 180 can wirelessly communicate with a mobile computation device—such as smartphone, tablet, or smartwatch worn or carried by the cyclist—in order to report ride-related data such as the current battery charge, the current level of pedal assistance, and/or the current operating power of the motor 162.

Generally, the controller can include a processor configured to execute operational envelope detection and pedal assistance algorithms of the bicycle propulsion system 100. Thus, the controller can access data from the various sensors included in the electronics subsystem 180 and from the controller and can wirelessly communicate (e.g., via an integrated wireless chip) with other I/O devices in order to execute various processes further described below.

4.5.1 Operational Envelope Detection

In one implementation, the electronics subsystem 180 is configured to detect whether the bicycle propulsion system 100 is within its operational envelope in order to ensure that the bicycle propulsion system 100 only applies power to the sprocket of the bicycle while the concentric rotor assembly 102 is engaged with the sprocket of the bicycle, while the chassis assembly is secured to a frame element of the bicycle, and while the bicycle itself is in a safely operable state (e.g., not exceeding a maximum speed or in an inoperable orientation). More specifically, the electronics subsystem 180 is configured to, in response to detecting the position of the chassis assembly 104 outside of a predefined operational envelope, halting the motor 162. Thus, the bicycle propulsion system 100 can ensure that power is cut from the motor 162 in the case of a crash or dislodgement of the bicycle propulsion system 100 from its nominal position relative to the bicycle.

In one implementation, the electronics subsystem 180 can store a set of parameters indicating the operational envelope for the bicycle propulsion system 100, such as a maximum and minimum lateral angle (i.e. inboard/outboard tilt), a maximum and minimum transverse angle (i.e. forward and backward tilt), a maximum and minimum speed, and the state of engagement of the sensor subassembly 170. In this implementation, the electronics subsystem 180 can measure the orientation of chassis assembly prior to and/or during operation of the bicycle propulsion system 100 and in response to detecting that the orientation of the chassis assembly 104 exceeds the maximum lateral angle and/or the maximum transverse angle and/or is less than the minimum lateral angle or the minimum transverse angle, the electronics subsystem 180 halts and/or cuts power to the motor 162. In one example, the electronics subsystem 180 can halt the motor 162 in response to detecting a lateral angle greater than 30 degrees from vertical. Likewise, the electronics subsystem 180 can estimate the speed of the chassis assembly 104 by executing an inertial algorithm on data recorded via the inertial measurement unit and, in response to detecting a speed exceeding the maximum speed or a speed less than the minimum speed, the electronics subsystem 180 can halt the motor 162.

Additionally, the electronics subsystem 180 can measure velocity of the chassis assembly in multiple dimensions and can store multiple maximum and minimum velocities, each corresponding to velocity measured in a different dimension. Thus, the electronics subsystem 180 can detect lateral movement (e.g., skidding) and halt the motor 162 to enable the cyclist to more easily regain traction between the rear wheel and the ground.

In another implementation, the electronics subsystem 180 can detect whether the sensor arm 171 is engaged with the chain by detecting whether the sensor arm 171 is deflected by less than a threshold deflection caused by a tensionless chain. For example, the electronics subsystem 180 can include a predefined deflection corresponding to a state where the sensor arm 171 is not engaged with the chain and is fully biased (e.g., by the biasing spring) against a hard stop integrated within the chassis assembly 104. Therefore, in response to detecting that the chain is disengaged with the chain roller 176 of the sensor arm 171 and the tension of the chain is no longer detected by the electronics subsystem 180, the electronics subsystem 180 can halt the motor 162.

4.5.2 Adaptive Pedal Assistance

Generally, the electronics subsystem 180 can execute an adaptive pedal assistance algorithm based on the estimated power output by the cyclist (e.g., via measurement of chain tension by the sensor subassembly 170, via integration with a power meter, or via a pressure sensor detecting the force exerted by the chassis assembly 104 on the chain stay of the bicycle), the current gear selection of the cyclist, the cadence of the cyclist, the estimated inclination of the bicycle, and/or the estimated speed of the bicycle in order to selectively apply additional power to the sprocket of the bicycle without substantially altering the handling of the bicycle or the operational experience of the bicycle when compared to manual operation of the same bicycle. More specifically, the electronics subsystem 180 is configured to estimate the power output by the cyclist based on deflection of the sensor arm 171 caused by tension in the bicycle chain and modify the output power of the motor 162 based on this measured deflection; estimate the gear selection of the bicycle based on step changes in the deflection of the sensor arm 171; estimate the inclination of the bicycle relative to the ground plane based on data from the inertial measurement unit; and estimate the speed of the bicycle based on an estimated cadence of the cyclist and the gear selection of the bicycle.

In one implementation, the electronics subsystem 180 can store a predefined lookup table (based on empirical data) or a predefined function correlating deflection of the sensor arm 171 to the power output by the cyclist. In this implementation, the electronics subsystem 180 can receive (e.g., via an associated application running on a smartphone) the gear configuration (e.g., brand cassette and chainring selection) of the bicycle. The electronics subsystem 180 can then select a function or lookup table corresponding to the gear configuration of the bicycle.

Alternatively, the electronics subsystem 180 can initiate a calibration procedure based on input from a mobile computation device (e.g., via an associated application running on a smartphone) in order to associate the power output by the cyclist with deflection of the chain. During the calibration procedure, the electronics subsystem 180 can measure the deflection of the chain of the bicycle as the cyclist is instructed to perform a series of hard and easy efforts. Based on these data, the electronics subsystem 180 can then correlate the deflection of the chain of the bicycle with maximum and minimum efforts of the cyclist.

In another implementation, the electronics subsystem 180 can: store a model, map, or lookup table that links predefined deflection ranges of the sensor arm to a particular sprocket selection in the rear cogset; measure deflection of the sensor arm 171; and predict the gear selection of the bicycle based on this model and the measured deflection. Alternatively, the electronics subsystem 180 can execute a calibration procedure by: for a first sprocket in the cogset of the bicycle, prompting the cyclist to shift into the first sprocket and pedal (e.g., at variable effort levels); recording deflection of the sensor arm 171 for a first duration; and repeating this procedure for successive sprockets of the cogset of the bicycle.

In yet another implementation, the electronics subsystem 180 can: execute frequency analysis on the measured deflection of the sensor arm 171 over time to estimate the cadence of the cyclist; and modify the power output by the motor 162 based on the cadence of the cyclist. For example, in response to estimating a low cadence of the cyclist (e.g., less than 70 rotations-per-minute), the electronics subsystem 180 can increase the power output of the motor 162. Alternatively, in response to estimating a high cadence of the cyclist (e.g., greater than 100 rotations-per-minute), the electronics subsystem 180 can decrease the power output of the motor 162. Thus, the electronics subsystem 180 leverages the cyclic nature of the torque applied by the cyclist during each pedal stroke to estimate the cadence of the cyclist and can modify the power output of the motor 162 based on this estimated cadence.

In another implementation, the electronics subsystem 180 can estimate the inclination of the bicycle by calculating, via the inertial measurement unit, the transverse orientation of the chassis assembly 104. Based on a known orientation of the chassis assembly 104 while the bicycle is on flat ground, the electronics subsystem 180 can calculate the inclination of the bicycle and modify the power output of the motor 162 based on this inclination.

In another implementation, the electronics subsystem 180 can implement dead reckoning techniques to estimate the speed of the speed of the bicycle based on inertial data output by the inertial measurement unit. Additionally or alternatively, the electronics subsystem 180 can calculate the speed of the bicycle directly based on the estimated cadence of the cyclist, the estimated gear selection of the bicycle, and a known wheel diameter of the bicycle. In yet another implementation, the electronics subsystem 180 can: measure a rotational speed of the motor 162 (e.g., via a rotational encoder, via Hall effect sensors proximal to the motor, or via measurement of the counter-electromotive force of the motor 162); and estimate the speed of the bicycle based on the measured rotational speed of the motor 162, the gear ratio between the motor 162 and the wheel of the bicycle, and the known wheel diameter of the bicycle.

Upon calculating and/or estimating each of the above values, the electronics subsystem 180 can input these values into a tuned function in order to calculate an output power for the motor 162. The electronic subsystem 180 then communicates this output power to the motor 162; and draws power from the battery assembly 106 sufficient to operate the motor 162 at this output power. In one implementation, the electronics subsystem 180 is configured to calculate an output power of zero upon detecting a speed of the bicycle greater than a threshold speed in order to comply with regulations on electric bicycles.

Thus, the electronics subsystem 180 can be configured to: calculate a cadence of the bicycle based on periodic deflection of the sensor arm 171; calculate a speed of the bicycle via the six-axis inertial measurement unit; identify a current gear ratio of the bicycle based on the speed of the bicycle and the cadence of the bicycle; and drive the motor 162 based on the current gear ratio of the bicycle.

4.5.3 Automatic Backpedaling Assistance

In one implementation, the electronics subsystem 180 can execute automatic backpedaling assistance to enable the bicycle equipped with the bicycle propulsion system 100 to mimic the pedaling dynamics of a standard bicycle. Because, the concentric rotor assembly 102, the drive subassembly, and the motor 162 all impose additional resistance (e.g., in the form of friction, additional rotational weight) onto the sprocket when the motor 162 is not powered, without automatic backpedaling assistance, the cyclist may be unable to backpedal the bicycle. Thus, upon detecting that the cyclist is no longer pedaling (e.g., based on the chain tension estimated via the sensor arm 171), the electronics subsystem 180 can cause the motor 162 to reverse direction at a predetermined speed, thereby enabling the user to pedal backward up to a threshold cadence corresponding to the predetermined backpedaling speed.

5. Battery Assembly

Generally, as shown in FIG. 1, the bicycle propulsion system 100 can include a battery assembly 106 connected to the chassis assembly 104 by a power cable 182 (or integrated directly with the chassis assembly 104) in order to supply power to the electronics subsystem 180 and the motor 162). In one implementation, the bicycle propulsion system 100 is configured to: fit within a standard bicycle bottle holder; supply power to the motor 162; and supply power to the electronics subsystem 180. In this implementation, the battery assembly 106 also includes a power cable 182 electrically coupling the battery assembly 106 to the electronics subsystem 180 and the motor 162. Thus, by including a battery assembly 106 that fits within a standard bicycle bottle holder, the bicycle propulsion system 100 can be more easily installed on any bicycle already including a standard bottle holder.

In one implementation, the bicycle propulsion system 100 includes a battery assembly 106 further including a set of modular battery packs configured to engage with each other and configured to fit within a standard bicycle bottle holder. This modular battery assembly 106 enables the user to bring only the battery capacity needed for a planned trip and reduce the total weight of the bicycle propulsion system 100 in accordance with the needed capacity. In one example, the battery assembly 106 can include a set of cylindrical modular batteries configured to connect at the top and bottom of the cylinder and configured to slide into a standard bicycle bottle holder. Additionally, in this example the battery assembly 106 can include a topmost cylindrical battery configured to engage the power cable 182 and a bottommost cylindrical battery defining a flat bottom such that the bottommost cylindrical battery rests evenly at the bottom of a standard bicycle bottle holder. In another example, the battery assembly 106 can include an exterior battery shell (e.g., in the form of a hollow cylinder) and configured to support a set of modular batteries within the exterior battery shell. In this example, the exterior battery shell can include an integrated electronic battery management unit connected to each modular battery in the set of modular batteries in order to modulate power drawn from each modular battery in the set of modular batteries. The exterior battery shell can be configured to secure the set of modular batteries within the exterior battery shell via friction or via a set of mechanical locks or latches. Each modular batter in the set of modular batteries can include a female surface and a male surface on the top and bottom of the modular battery respectively (or vice versa) in order to aid in engaging each modular battery with other modular batteries in the set of modular batteries. Additionally, in this example, the topmost modular battery in the set of modular batteries an include a connector or adapter configured to electrically couple the battery assembly 106 to the power cable 182.

In another implementation, the bicycle propulsion system 100 can include a battery assembly 106 integrated with the chassis assembly 104 or configured to attach to the chain stay, seat stay, seat tube, downtube, or top tube of the bicycle. In each implementation, the bicycle propulsion system 100 can include a power cable 182 of an appropriate length to connect the battery assembly 106 the chassis assembly 104. Alternatively, the bicycle propulsion system 100 can include a battery assembly 106 that directly connects directly the chassis assembly 104 without a power cable 182.

6. Throttle Assembly

In one variation shown in FIG. 1, the bicycle propulsion system 100 includes a throttle assembly 108. For example, the throttle assembly 108 can include a set of buttons and can transmit button selections to the controller. The controller can then: adjust a relationship between chain tension (or cyclist output power) and torque or power output of the motor; or switch the bicycle propulsion system 100 on and off based on selections of these buttons. The throttle assembly 108 can additionally or alternatively display system data received from the controller, such as battery level, assistance level, and/or ride statistics.

7. Chainring-Mounted Variation

In one variation, the bicycle propulsion system 100 is configured to engage with one or more front sprockets (i.e. chainrings) of the bicycle (as opposed to the rear cogset) in order to convert bicycles without sufficient clearance in proximal to the rear triangle of the bicycle or mountain bikes with cogset sprockets above a threshold diameter to an electrically assisted bicycle. In this variation, the bicycle propulsion system 100 can include a concentric rotor assembly 102 configured to engage with an innermost set of chainrings of the bicycle and a chassis assembly 104 configured to rest between the seat tube and the downtube of the bicycle or configured to attach below the downtube of the bicycle. Alternatively, in this variation, the bicycle propulsion system 100 can include a concentric rotor assembly 102 configured to engage with the outermost chainring of the bicycle. This variation of the bicycle propulsion system 100 can include the same set of components described above with respect to the rear cogset variation that instead defines a form factor configured to fit within the bottom bracket region of the bicycle.

8. Disk-Brake-Mounted Variation

In another variation, the bicycle propulsion system 100 is configured to mount to and/or replace the rear disk brake rotor and the rear disk brake caliper of a disk brake bicycle in order to vacate the innermost sprocket, thereby enabling use of the entire cogset of the bicycle. More specifically, in this variation, the bicycle propulsion system 100 can include: a concentric rotor assembly 102 configured to replace the rear disk brake rotor of the disk brake bicycle and including a braking surface; and a chassis assembly 104 configured to mount to the left side rear chain stay and/or the left side rear seat stay and including a braking caliper. Thus, in this variation, the bicycle propulsion system 100 can drive the rear wheel of the bicycle via a concentric rotor assembly 102 configured to replace the disk brake rotor of a disk brake bicycle and can replace the functionality of the replaced disk brake rotor via the inclusion of a braking surface on the concentric rotor assembly 102. Additionally, in this variation, the concentric rotor assembly 102 can include a center axle that replaces the through-axle of the disk brake assembly and can, therefore, be driven via a direct power transmission between the motor 162 and this through-axle. Alternatively, in this variation of the bicycle propulsion system 100, the concentric rotor assembly 102 can include an outer drive surface 132 and the bicycle propulsion system 100 can apply torque to this outer drive surface 132 via the drive subassembly as described above.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A bicycle propulsion system comprising:
   an annular rotor assembly:
      operable in an open configuration and a closed configuration; and
      comprising:
         a first rotor element;
         a second rotor element cooperating with the first rotor element to form a circular outer drive surface around a first bicycle sprocket in the closed configuration;
         a first sprocket bracket extending inwardly from the first rotor element and configured to engage the first bicycle sprocket in the closed configuration; and
         a second sprocket bracket extending inwardly from the second rotor element and configured to engage the first bicycle sprocket in the closed configuration; and
   a chassis assembly:
      configured to transiently couple to a frame element of a bicycle;
      comprising a retention subassembly configured to locate the annular rotor assembly, in the closed configuration, relative to the chassis assembly;

comprising a motor; and
comprising a drive subassembly configured to transfer torque output by the motor into the circular outer drive surface, formed by the first rotor element and the second rotor element in the closed configuration, to rotate the first bicycle sprocket via the first sprocket bracket and the second sprocket bracket.

2. The bicycle propulsion system of claim 1:
wherein a second rotor element cooperates with the first rotor element to form the circular outer drive surface comprising a continuous toothed gear around and concentric with the first bicycle sprocket in the closed configuration; and
wherein the drive subassembly comprises a toothed gear:
arranged on an output shaft of the motor; and
configured to mesh with the continuous toothed gear formed by the first rotor element and the second rotor element in the closed configuration.

3. The bicycle propulsion system of claim 1:
wherein the first sprocket bracket and the second sprocket bracket are configured to engage the first bicycle sprocket in the closed configuration, the first bicycle sprocket defining a first diameter and an outer sprocket face opposite a rear wheel of the bicycle
wherein the first sprocket bracket defines a first outer face inset from an inner sprocket face of a second bicycle sprocket, the second bicycle sprocket adjacent the first bicycle sprocket, opposite the bicycle wheel, and defining a second diameter less than the first diameter; and
wherein the second sprocket bracket defines a second outer face inset from the inner sprocket face of the second bicycle sprocket.

4. The bicycle propulsion system of claim 3, wherein the chassis assembly further comprises a derailleur stop configured to prevent a derailleur of the bicycle from transferring a chain from the second bicycle sprocket onto the first bicycle sprocket.

5. The bicycle propulsion system of claim 1:
wherein, in the closed configuration, the first rotor element and the second rotor element form the outer drive surface defining a continuous timing belt pulley;
wherein the chassis assembly defines a semicircular relief configured to receive less than half of an arc length of the circular outer drive surface defined by the first rotor element and the second rotor element in the closed configuration; and
wherein the drive subassembly comprises:
a set of drive belt rollers adjacent the semicircular relief;
a drive pulley mounted to the motor; and
a timing belt configured to:
mesh with the drive pulley;
run on the set of drive belt rollers;
mesh with the outer drive surface; and
transfer torque output by the motor into the circular outer drive surface.

6. The bicycle propulsion system of claim 5:
wherein the second rotor element cooperates with the first rotor element to form a first running surface on a first side of the circular outer drive surface and a second running surface on a second side of the circular outer drive surface in the closed configuration; and
wherein the retention subassembly comprises a set of outer retaining rollers:
adjacent the semicircular relief; and
configured to ride on the first running surface and the second running surface of the annular rotor assembly to laterally and longitudinally constrain the annular rotor assembly, in the closed configuration, relative to the chassis assembly.

7. The bicycle propulsion system of claim 6:
wherein the second rotor element cooperates with the first rotor element to form an inner retention surface inset the circular outer drive surface in the closed configuration; and
wherein the retention subassembly further comprises a set of inner retaining rollers:
adjacent the semicircular relief;
configured to ride on the inner retention surface; and
cooperating with the set of outer retaining rollers to constrain the annular rotor assembly, in the closed configuration, relative to the chassis assembly in three degrees of translation and two degrees of rotation.

8. The bicycle propulsion system of claim 1, wherein the first sprocket bracket defines:
a first set of engagement features configured to insert between and to engage teeth of the first bicycle sprocket;
a second set of engagement features:
configured to insert between and to engage teeth of the first bicycle sprocket; and
interdigitated between the first set of engagement features;
a first set of outboard retaining teeth arranged on left sides of the first set of engagement features; and
a second set of outboard retaining teeth:
arranged on right sides of the second set of engagement features; and
configured to laterally constrain the first sprocket bracket on the first bicycle sprocket.

9. The bicycle propulsion system of claim 1:
wherein the first sprocket bracket is transiently coupled to and extends inwardly from the first rotor element by a first length to mesh with the first bicycle sprocket characterized by a first bicycle sprocket diameter;
wherein the second sprocket bracket is transiently coupled to and extends inwardly from the second rotor element by the first length to mesh with the first bicycle sprocket; and
further comprising:
a third sprocket bracket:
configured to couple to the first rotor element in replacement of the first sprocket bracket; and
extending inwardly from the first rotor element by a second length greater than the first length to mesh with a second bicycle sprocket characterized by a second sprocket diameter less than the first bicycle sprocket diameter; and
a fourth sprocket bracket:
configured to couple to the first rotor element in replacement of the first sprocket bracket and in conjunction with the third sprocket bracket; and
extending inwardly from the second rotor element by the second length to mesh with the second bicycle sprocket.

10. The bicycle propulsion system of claim 1:
wherein the first rotor element and the first sprocket bracket are physically coextensive; and
wherein the second rotor element and the second sprocket bracket are physically coextensive.

11. The bicycle propulsion system of claim 1:
wherein the first rotor element:
  defines a first end;
  defines a second end opposite the first end; and
  comprises a latching pin proximal the second end;
wherein the second rotor element:
  defines a third end pivotably coupled to the first end of the first rotor element;
  defines a fourth end opposite the third end;
  comprises a latch
    proximal the fourth end; and
    configured to engage the latching pin to retain the first rotor element and the second rotor element in the closed configuration.

12. The bicycle propulsion system of claim 11, wherein the first rotor element pivots on the second rotor element to transition the annular rotor assembly from the closed configuration to the open configuration, the first sprocket bracket and the second sprocket bracket decoupled from the first bicycle sprocket in the open configuration.

13. The bicycle propulsion system of claim 1:
wherein the first rotor element spans a first arc segment of a first arcuate length; and
wherein the second rotor element:
  spans a second arc segment of a second arcuate length; and
  cooperates with the first rotor element to form a contiguous annulus, concentric with first bicycle sprocket, in the closed configuration.

14. The bicycle propulsion system of claim 13:
wherein the first sprocket bracket comprises a first mesh:
  configured to engage a first subset of teeth of the first bicycle sprocket in the closed configuration; and
  spanning a third arc segment of a third arcuate length less than the first arcuate length; and
wherein the second sprocket bracket comprises a second mesh:
  configured to engage a second subset of teeth, distinct from the first subset of teeth, of the first bicycle sprocket in the closed configuration; and
  spanning a fourth arc segment of a fourth arcuate length less than the second arcuate length.

15. The bicycle propulsion system of claim 13, wherein the first sprocket bracket and the second sprocket bracket cooperate to mesh with between 25 percent and 60 percent of teeth of the first bicycle sprocket in the closed configuration.

16. The bicycle propulsion system of claim 1, wherein the chassis assembly further comprises:
a roller sprung against and configured to ride on a bicycle chain of the bicycle;
a sensor configured to output a signal representing a position of the roller; and
a controller configured to:
  interpret a tension in the bicycle chain based on the position of the roller; and
  actuate the motor to rotate the annular rotor assembly based on the tension in the bicycle chain.

17. The bicycle propulsion system of claim 16, wherein the controller is configured to control torque output of the motor proportional to the tension in the bicycle chain.

18. A bicycle propulsion system comprising:
a first rotor element;
a second rotor element cooperating with the first rotor element to form:
  a circular outer drive surface around a first bicycle sprocket in a closed configuration; and
  decoupled from the first bicycle sprocket in an open configuration;
a first sprocket bracket inset from the first rotor element, coupled to the first rotor element, and configured to engage the first bicycle sprocket in the closed configuration;
a second sprocket bracket inset from the second rotor element, coupled to the second rotor element, and configured to engage the first bicycle sprocket in the closed configuration;
a chassis configured to transiently couple to a frame element of a bicycle;
a rotor retainer arranged on the chassis and configured to locate the first rotor element and the second rotor element, in the closed configuration, relative to the chassis;
a motor mounted to the chassis; and
a drive assembly:
  arranged on the chassis; and
  configured to transfer torque output by the motor into the circular outer drive surface, formed by the first rotor element and the second rotor element in the closed configuration, to rotate the first bicycle sprocket via the first sprocket bracket and the second sprocket bracket.

19. A bicycle propulsion system comprising:
a first rotor element;
a second rotor element cooperating with the first rotor element to form an outer drive surface around a first bicycle sprocket in a closed configuration; and
a first sprocket interface inset from the first rotor element and configured to transmit torque from the first rotor element into the first bicycle sprocket in the closed configuration;
a second sprocket interface inset from the second rotor element and configured to transmit torque from the second rotor element into the first bicycle sprocket in the closed configuration;
a chassis configured to transiently couple to a bicycle frame;
a rotor retainer arranged on the chassis and configured to locate the first rotor element and the second rotor element, in the closed configuration, relative to the chassis;
a motor mounted to the chassis; and
a drive assembly:
  arranged on the chassis; and
  configured to transfer torque output by the motor into the circular outer drive surface, formed by the first rotor element and the second rotor element in the closed configuration, to rotate the first bicycle sprocket.

20. The bicycle propulsion system of claim 19, further comprising:
a roller:
  arranged on the chassis; and
  sprung against and configured to ride on a bicycle chain of the bicycle;
a sensor:
  arranged on the chassis; and
  configured to output a signal representing a position of the roller; and
a controller
  arranged on the chassis; and
  configured to:
    interpret a tension in the bicycle chain based on the position of the roller; and actuate the motor to rotate the annular rotor assembly based on the tension in the bicycle chain.

* * * * *